(12) United States Patent
Takenaka et al.

(10) Patent No.: US 10,412,302 B2
(45) Date of Patent: *Sep. 10, 2019

(54) IMAGE PROCESSING APPARATUS, IMAGE PROCESSING METHOD, AND IMAGING SYSTEM

(71) Applicant: RICOH COMPANY, LTD., Tokyo (JP)

(72) Inventors: Hirokazu Takenaka, Kanagawa (JP); Kazuhiro Yoshida, Kanagawa (JP); Keiichi Kawaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,421

(22) Filed: Jul. 20, 2018

(65) Prior Publication Data

US 2018/0332221 A1 Nov. 15, 2018

Related U.S. Application Data

(63) Continuation of application No. 14/914,208, filed as application No. PCT/JP2014/072850 on Aug. 25, 2014, now Pat. No. 10,063,774.

(30) Foreign Application Priority Data

Aug. 28, 2013 (JP) .................. 2013-177176
Aug. 28, 2013 (JP) .................. 2013-177197

(51) Int. Cl.
*G06K 9/03* (2006.01)
*G06K 9/46* (2006.01)
(Continued)

(52) U.S. Cl.
CPC ........... *H04N 5/23238* (2013.01); *G06K 9/03* (2013.01); *G06K 9/4609* (2013.01);
(Continued)

(58) Field of Classification Search
CPC .. H04N 5/23238; H04N 1/387; H04N 1/3872; G06K 9/4609; G06K 9/03;
(Continued)

(56) References Cited

U.S. PATENT DOCUMENTS 6,002,430 A 12/1999 McCall et al.
6,157,747 A 12/2000 Szeliski et al.
(Continued)

FOREIGN PATENT DOCUMENTS

JP H09-322061 12/1997
JP H10-126665 5/1998
(Continued)

OTHER PUBLICATIONS

Extended European Search Report dated Apr. 26, 2018 in European Application No. 17209702.4.
(Continued)

*Primary Examiner* — On S Mung
(74) *Attorney, Agent, or Firm* — Xsensus LLP

(57) ABSTRACT

An image processing apparatus detecting a plurality of joint positions between a plurality of input images includes a target image generation unit configured to generate a plurality of target images to be searched in a second input image among the input images from a first input image among the input images; a characteristic amount calculation unit configured to calculate a characteristic amount for each of the target images generated by the target image generation unit; and a joint position determination unit configured to determine the joint position for a target image of interest among the target images having the characteristic amounts calculated by the characteristic amount calculation unit depending on the characteristic amount.

8 Claims, 24 Drawing Sheets

(51) Int. Cl.
*G06K 9/62* (2006.01)
*G06T 3/00* (2006.01)
*G06T 3/40* (2006.01)
*G06T 3/60* (2006.01)
*H04N 1/387* (2006.01)
*H04N 5/232* (2006.01)

(52) U.S. Cl.
CPC ......... *G06K 9/6202* (2013.01); *G06K 9/6215* (2013.01); *G06T 3/0062* (2013.01); *G06T 3/4038* (2013.01); *G06T 3/60* (2013.01); *H04N 1/387* (2013.01); *H04N 1/3872* (2013.01); *G06T 2207/10016* (2013.01)

(58) Field of Classification Search
CPC .. G06K 9/6202; G06K 9/6215; G06T 3/0062; G06T 3/4038; G06T 3/60; G06T 2207/10016
USPC .......................................................... 348/36
See application file for complete search history.

(56) References Cited

U.S. PATENT DOCUMENTS

| | | |
|---|---|---|
| 6,249,616 B1 | 6/2001 | Hashimoto |
| 6,473,536 B1 | 10/2002 | Chiba et al. |
| 7,565,029 B2 | 7/2009 | Zhou et al. |
| 7,986,838 B2 | 7/2011 | Ohira et al. |
| 8,625,928 B2 | 1/2014 | Fukushi |
| 8,798,130 B2 | 8/2014 | Yoshino et al. |
| 8,854,359 B2 | 10/2014 | Takenaka et al. |
| 9,074,848 B1 | 7/2015 | Hunter, Jr. et al. |
| 9,288,476 B2 | 3/2016 | Sandrew et al. |
| 2009/0141984 A1 | 6/2009 | Nakamura et al. |
| 2010/0061601 A1 | 3/2010 | Abramoff et al. |
| 2011/0069762 A1 | 3/2011 | Yoshino et al. |
| 2011/0176731 A1 | 7/2011 | Fukushi |
| 2011/0292217 A1 | 12/2011 | Ohta |
| 2011/0293139 A1 | 12/2011 | Ohta |
| 2013/0278748 A1 | 10/2013 | Nakayama et al. |
| 2014/0071227 A1 | 3/2014 | Takenaka et al. |
| 2015/0062363 A1 | 3/2015 | Takenaka et al. |

FOREIGN PATENT DOCUMENTS

| | | |
|---|---|---|
| JP | 2001-148779 | 5/2001 |
| JP | 2006-094237 | 4/2006 |
| JP | 2009-042942 | 2/2009 |
| JP | 2009-044612 | 2/2009 |
| JP | 2011-150432 | 8/2011 |
| WO | 2013/133456 A1 | 9/2013 |

OTHER PUBLICATIONS

Yun-Ho Ko et al., Adaptive Search Range Motion Estimation using Neighboring Motion Vector Differences, IEEE Transactions on Consumer Electronics, IEEE Service Center, New York, NY, US, vol. 57, No. 2, May 1, 2011, pp. 726-730.
Extended European Search Report dated Oct. 27, 2016 in Patent Application No. 14838987.7.
Rintu Abraham, et al., "Review on Mosaicing Techniques in Image Processing" 2013 Third International Conference on Advanced Computing & Communication Technologies (ACCT), IEEE, XP032420980, Apr. 6, 2013, pp. 63-68.
International Search Report dated Nov. 18, 2014 in PCT/JP2014/072850 filed on Aug. 25, 2014.
Japanese Office Action dated Jul. 21, 2015 for related Japanese Application No. 2013-0177176.
Office Action dated May 26, 2016 in co-pending U.S. Appl. No. 14/925,702.

(A)

(B)

(A)

(B)

| COORDINATES AFTER CONVERSION | | COORDINATES BEFORE CONVERSION | |
|---|---|---|---|
| $\theta$ (pix) | $\phi$ (pix) | x (pix) | y (pix) |
| 0 | 0 | | |
| 1 | 0 | | |
| ⋮ | ⋮ | ⋮ | ⋮ |
| 3598 | 1799 | | |
| 3599 | 1799 | | |

(A)

(B)

(A)

(B)   (C)

(D)

(A)

(B)

(C)

(A)

(B)

(C)

(A)

SEARCH POSITION (kx, ky)

| COORDINATES AFTER CONVERSION | | JOINT POSITION (SHIFT AMOUNT) | |
|---|---|---|---|
| $\theta$ (pix) | $\phi$ (pix) | $\Delta \theta$ (pix) | $\Delta \phi$ (pix) |
| 0 | 0 | | |
| 1 | 0 | | |
| ⋮ | ⋮ | ⋮ | ⋮ |
| 3598 | 1799 | | |
| 3599 | 1799 | | |

(A)

(B)

(A)

(B)

IMAGE PROCESSING APPARATUS, IMAGE PROCESSING METHOD, AND IMAGING SYSTEM

CROSS-REFERENCE TO RELATED APPLICATIONS

The present application is a continuation of U.S. application Ser. No. 14/914,208, filed Feb. 24, 2016, which is a National Stage of Application No. PCT/JP2014/072850, filed Aug. 25, 2014, which is based on and claims the benefit of priority of Japanese Priority Application No. 2013-177176 filed on Aug. 28, 2013, and Japanese Priority Application No. 2013-177197 filed on Aug. 28, 2013, with the Japanese Patent Office, the entire contents of which are hereby incorporated by reference.

TECHNICAL FIELD

The disclosures herein generally relate to an image processing apparatus, an image processing method, and an imaging system, more specifically, an image processing apparatus, an image processing method, and an imaging system that piece multiple input images together.

BACKGROUND ART

An entire celestial sphere imaging system has been known that uses multiple wide-angle lenses such as fisheye lenses or superwide-angle lenses to capture an omniazimuth (referred to as "entire celestial sphere" below) image at once. The entire celestial sphere imaging system generates an entire celestial sphere image by projecting images from the lenses onto sensor surfaces and piecing the images together by image processing. It is possible to generate such an entire celestial sphere image by using, for example, two wide-angle lenses having field angles greater than 180°.

In the image processing, distortion correction and projective transform are applied to partial images captured by the lens optical systems, based on a predetermined projection model and considering distortion from an ideal model. Then, the partial images are pieced together using overlapped parts included in the partial images, to generate a single entire celestial sphere image. In the process of piecing the images together, joint positions of overlapped objects are detected by using pattern matching in the overlapped parts of the partial images.

However, for the conventional joint position detection technology using pattern matching, it is difficult to detect appropriate joint positions if a region to be matched is a flat image or has few characteristics where the same pattern is repeated. Therefore, the partial images cannot favorably be pieced together, which may reduce the quality of the obtained entire celestial sphere image.

Various technologies have been known that piece captured multiple partial images together using multiple cameras. For example, Japanese Laid-open Patent Publication No. 2001-148779 (Patent Document 1) discloses an image processing apparatus that has an object to synthesize an image with high precision by avoiding an error of pattern matching caused when an inappropriate matching region is used when performing the pattern matching. The conventional technology in Patent Document 1 is configured to determine whether a matching region extracted by a matching region extraction unit is appropriate, and if the matching region is inappropriate, to execute extraction again. It is also configured to determine whether a matching result by a pattern matching unit is appropriate, and if the matching result is not appropriate, to execute extraction of a matching region again.

To improve precision of image synthesis, the conventional technology in Patent Document 1 removes in advance regions inappropriate as matching regions, for example, a region of all white pixels or black pixels, or a region including a continuous line in the vertical direction, the lateral direction, or an oblique direction before performing pattern matching.

However, the conventional technology in Patent Document 1 is a technology that executes extraction of a matching region again if a matching region is inappropriate. Therefore, it is still difficult to determine an appropriate joint position for a matching region that is determined as inappropriate.

RELATED-ART DOCUMENTS

Patent Documents

[Patent Document 1] Japanese Laid-open Patent Publication No. 2001-148779

SUMMARY OF THE INVENTION

Problem to be Solved by Invention

The present invention is made in view of the above unsatisfactory points of the conventional technology, and has an object to provide an image processing apparatus, an image processing method, a program, and an imaging system that are capable of detecting appropriate joint positions when detecting joint positions between multiple input images.

Means to Solve the Problem

According to at least one embodiment of the present invention, an image processing apparatus detecting a plurality of joint positions between a plurality of input images includes a target image generation unit configured to generate a plurality of target images to be searched in a second input image among the input images from a first input image among the input images; a characteristic amount calculation unit configured to calculate a characteristic amount for each of the target images generated by the target image generation unit; and a joint position determination unit configured to determine the joint position for a target image of interest among the target images having the characteristic amounts calculated by the characteristic amount calculation unit depending on the characteristic amount.

Advantage of the Invention

According to at least one embodiment of the present invention, it is possible to detect appropriate joint positions when detecting joint positions between multiple input images.

BRIEF DESCRIPTION OF DRAWINGS

FIG. 18 is a diagram illustrating a data structure of detection result data generated by a joint position detection unit according to the first embodiment;

MODE FOR CARRYING OUT THE INVENTION

In the following, a first embodiment of the present invention will be described with reference to the drawings. Note that embodiments of the present invention are not limited to the present embodiment described in the following. As an example of an image processing apparatus and an imaging system, the present embodiment will be described using an entire celestial sphere imaging system 10 that includes an imaging unit whose optical system has two fisheye lenses, and an image processing function to generate an entire celestial sphere image by applying distortion correction and projective transform to two partial images captured by the fisheye lenses, and piecing the images together.

[Overall Configuration]

Figure 1:
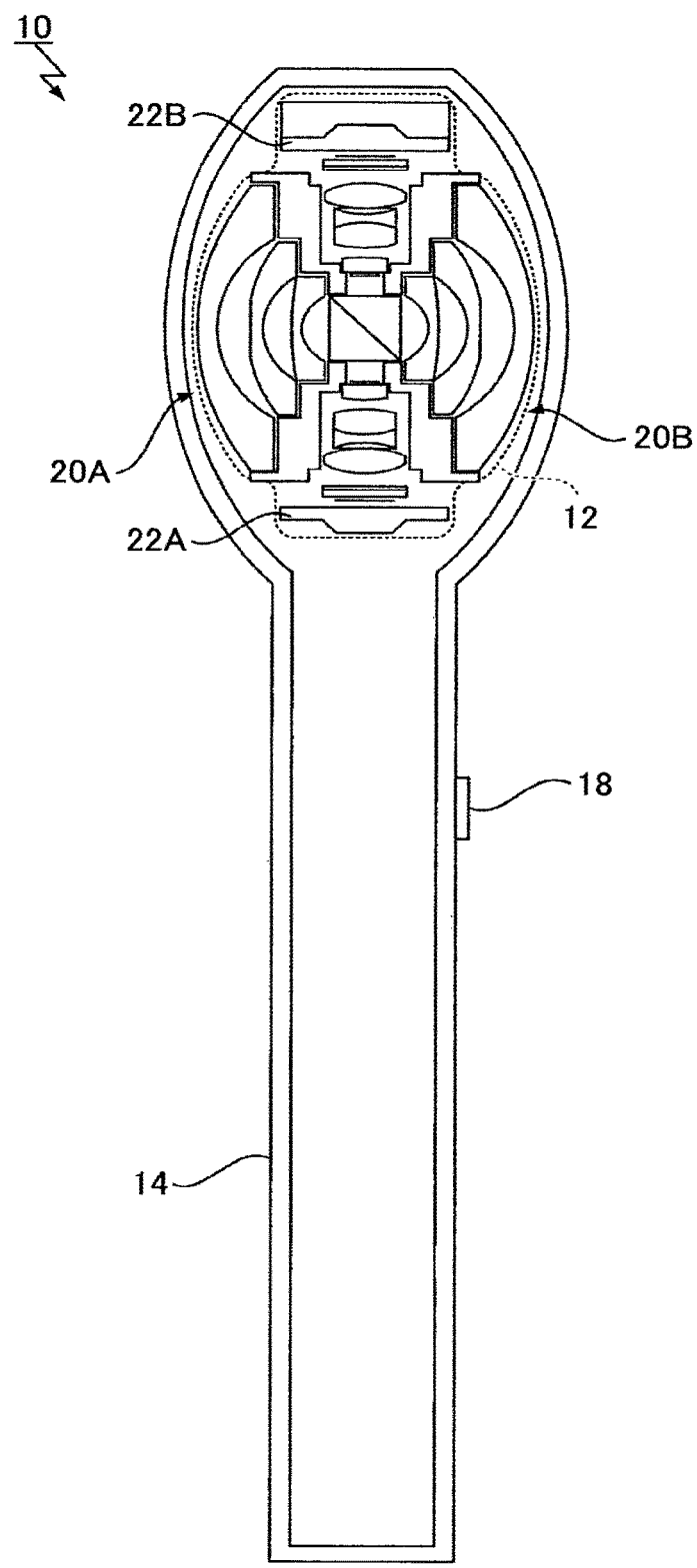
FIG. 1 is a cross-sectional view of an entire celestial sphere imaging system according to a first embodiment of the present invention.

In the following, a whole configuration of the entire celestial sphere imaging system 10 will be described according to the present embodiment with reference to FIGS. 1-3. FIG. 1 is a cross-sectional view of the entire celestial sphere imaging system (simply referred to as the "imaging system" below) 10 according to the present embodiment. The imaging system 10 illustrated in FIG. 1 includes an imaging unit 12, a housing 14 to hold parts such as the imaging unit 12, a controller, a battery, and a shutter button 18 disposed on the housing 14. The imaging unit 12 illustrated in FIG. 1 includes two imaging forming optical systems 20A and 20B, and two solid-state image sensing devices 22A and 22B such as CCD (Charge Coupled Device) sensors or CMOS (Complementary Metal Oxide Semiconductor) sensors. A combination of one imaging forming optical system 20 and one solid-state image sensing device 22 is referred to as an imaging optical system. Each of the imaging forming optical systems 20 may be constituted with, for example, a six-group seven-lens fisheye lens. In the example illustrated in FIG. 1, the fisheye lens has an overall field angle of greater than 180° (=360°/n where n=2), preferably the field angle of greater than 185°, or even preferably the field angle of greater than 190°.

The optical elements (the lens, prism, filter, and aperture diaphragm) of the imaging forming optical systems 20A-20B are positioned relative to the solid-state image sensing devices 22A-22B. The positions are determined so that the optical axis of the optical elements of the imaging forming optical systems 20A-20B is positioned perpendicular to the center parts of the light reception regions of the corresponding solid-state image sensing devices 22, and the light reception regions are positioned coincident with the imaging forming planes of the corresponding fisheye lenses. Each of the solid-state image sensing devices 22 is a two-dimensional solid-state image sensing device in which the light reception region occupies the area through which light collected by the combined imaging forming optical system 20 is converted into an image signal.

In the example illustrated in FIG. 1, the imaging forming optical systems 20A-20B have the same specification, and can be combined in the direction reverse to each other by having their optical axes coincident with each other. The solid-state image sensing devices 22A-22B convert light distribution of received light into image signals, and output the signals to an image processing unit of a controller (not illustrated). The image processing unit, which will be described later in detail, pieces together partial images input from the solid-state image sensing devices 22A-22B to synthesize and generate an image having a solid angle of $4\pi$ radian (referred to as an "entire celestial sphere image" below). The entire celestial sphere image is a captured image that can be viewed from an imaging point in all directions. Note that, in the example illustrated in FIG. 1, although the entire celestial sphere image is generated, it may be a what-is-called "panoramic image" that captures a 360° view only in horizontal directions.

Also note that by making the scanning directions of the solid-state image sensing devices 22A-22B equivalent to each other, the captured images can be pieced together more easily. Namely, making the scanning directions and order at a part to be pieced together equivalent to each other for the solid-state image sensing devices 22A-22B is effective to piece together an object, especially a moving object, at a boundary of cameras. For example, if an upper left part of a captured image captured by the solid-state image sensing device 22A coincides with a lower-left part of a captured image captured by the solid-state image sensing device 22B as parts to be pieced together as an image, the solid-state image sensing device 22A scans the image from top to bottom, and from right to left of the solid-state image sensing device 22A. On the other hand, the solid-state image sensing device 22B scans the image from bottom to top, and from right to left of the solid-state image sensing device 22B. In this way, by controlling the scanning directions of the solid-state image sensing devices to be coincident with each other based on parts of an image to be pieced together, an effect is obtained that the images can be pieced together more easily.

As described above, the fisheye lens has the overall field angle greater than 180°. Therefore, an overlapped part of a captured image in each of the imaging optical systems is referred to as reference data representing the same image when piecing the images together to generate an entire celestial sphere image. The generated entire celestial sphere image is output to an external recording medium disposed in the imaging unit 12, or connected with the imaging unit 12, for example, a display device, a print device, an SD (trademark) card, or a Compact Flash (trademark) memory.

Figure 2:
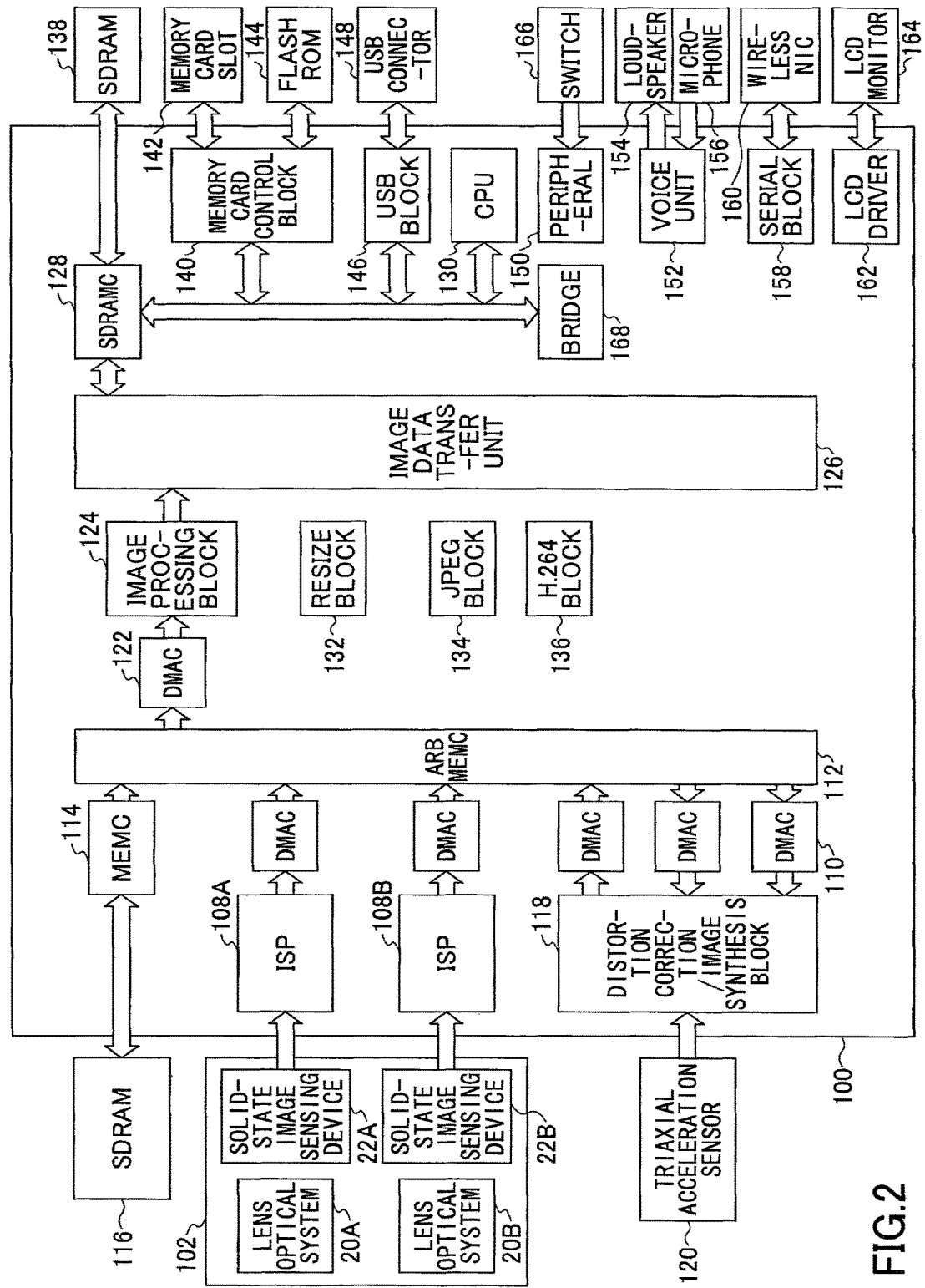
FIG. 2 is a hardware configuration diagram of the entire celestial sphere imaging system according to the first embodiment.

FIG. 2 is a hardware configuration diagram of the entire celestial sphere imaging system 10 according to the present embodiment. The imaging system 10 is configured with a digital still camera processor (simply referred to as a "processor" below) 100, a lens barrel unit 102, and various components connected with the processor 100. The lens barrel unit 102 includes two sets of the lens optical systems 20A-20B and the solid-state image sensing devices 22A-22B as described above. The solid-state image sensing device 22 is controlled by control commands from a CPU 130 in the processor 100 as will be described later.

The processor 100 includes ISPs (Image Signal Processors) 108, DMACs (Direct Memory Access Controllers) 110, an arbiter (ARBMEMC) 112 to arbitrate memory access, an MEMC (Memory Controller) 114 to control memory access, and a distortion correction/image synthesis block 118. The ISPs 108A-108B apply white balance setting and gamma setting to input image data having signal processing applied by the solid-state image sensing devices 22A-22B, respectively. The MEMC 114 is connected with an SDRAM 116. The SDRAM 116 temporarily stores data when applying a process in the ISPs 108A-180B and the distortion correction/image synthesis block 118. The distortion correction/image synthesis block 118 synthesizes an image by applying a distortion correction and a top-bottom correction to two partial images obtained from the two imaging optical systems, using information from a triaxial acceleration sensor 120.

The processor 100 further includes a DMAC 122, an image processing block 124, a CPU 130, an image data transfer unit 126, an SDRAMC 128, a memory card control block 140, an USB block 146, a peripheral block 150, a voice unit 152, a serial block 158, an LCD (Liquid Crystal Display) driver 162, and a bridge 168.

The CPU 130 controls operations of the units of the imaging system 10. The image processing block 124 applies various image processing to image data using a resize block 132, a JPEG block 134, and an H.264 block 136. The resize block 132 is a block to enlarge or reduce the size of image data by an interpolation process. The JPEG block 134 is a codec block to perform JPEG compression and expansion. The H.264 block 136 is a codec block to perform moving picture compression and expansion such as H.264. The image data transfer unit 126 transfers an image having image processing applied at the image processing block 124. The SDRAMC 128 controls an SDRAM 138 that is connected with the processor 100, to temporarily store image data in the SDRAM 138 when applying various processes to the image data in the processor 100.

The memory card control block 140 controls read/write to a memory card inserted into a memory card slot 142, and a flash ROM 144. The memory card slot 142 is a slot to attach/detach a memory card to/from the imaging system 10. The USB block 146 controls USB communication with an external device such as a personal computer that is connected via a USB connector 148. The peripheral block 150 is connected with a power switch 166. A voice unit 152 is connect with a microphone 156 for a user to input a voice signal, a loudspeaker 154 to output a recorded voice signal to control voice sound input/output. The serial block 158 controls serial communication with an external device such as a personal computer, and is connected with a wireless NIC (Network Interface Card) 160. The LCD driver 162 is a drive circuit to drive an LCD monitor 164, and converts signals for displaying various states on the LCD monitor 164.

The flash ROM 144 stores a control program described in a decodable code for the CPU 130 and various parameters. When the power source becomes an on-state due to an operation of the power switch 166, the control program is loaded into a main memory. Following the program read in the main memory, the CPU 130 controls operations of the units of the device, and temporarily stores data required for the control in the SDRAM 138 and a local SRAM (not illustrated).

Figure 3:
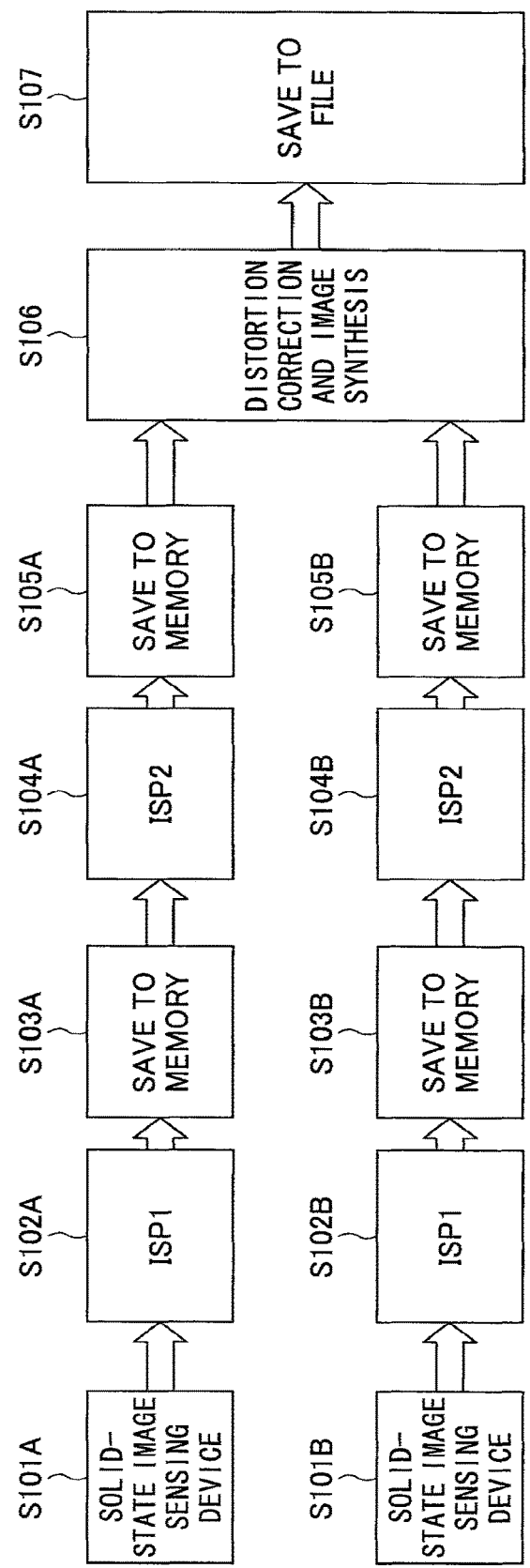
FIG. 3 is a flow of overall image processing in the entire celestial sphere imaging system according to the first embodiment.

FIG. 3 is a flow of overall image processing in the entire celestial sphere imaging system 10 according to the present embodiment. First, at Steps S101A and 101B, images are captured by the solid-state image sensing devices 22A-22B, respectively. At Steps S102A and 102B, each of the ISPs 108 illustrated in FIG. 2 applies an optical black correction process, a faulty pixel correction process, a linear correction process, a shading process, and a region partition and average process to Bayer RAW images output from the solid-state image sensing devices 22A-22B. At Steps S103A and 103B, the images are stored in the memory. At Steps S104A and 104B, each of the ISPs 108 illustrated in FIG. 2 further applies a white balance process, a gamma correction process, a Bayer interpolation process, a YUV conversion process, an edge reinforcement process, and a color correction process to the image, which is stored in the memory at Steps S105A and 105B.

Upon completion of the processes at the two solid-state image sensing devices 22A-22B, the partial images having the processes applied are treated with a distortion correction and a synthesis process at Step S106. At Step S107, an entire celestial sphere image is stored as a file in a built-in memory or an external storage, having an appropriate tag attached. Also, during the distortion correction and the synthesis process, an inclination and top-bottom correction may be applied by obtaining information from the triaxial acceleration sensor 120 if appropriate. Also, the stored image file may have a compression process applied if appropriate.

[Entire Celestial Sphere Image Synthesis Functions]

Figure 4:
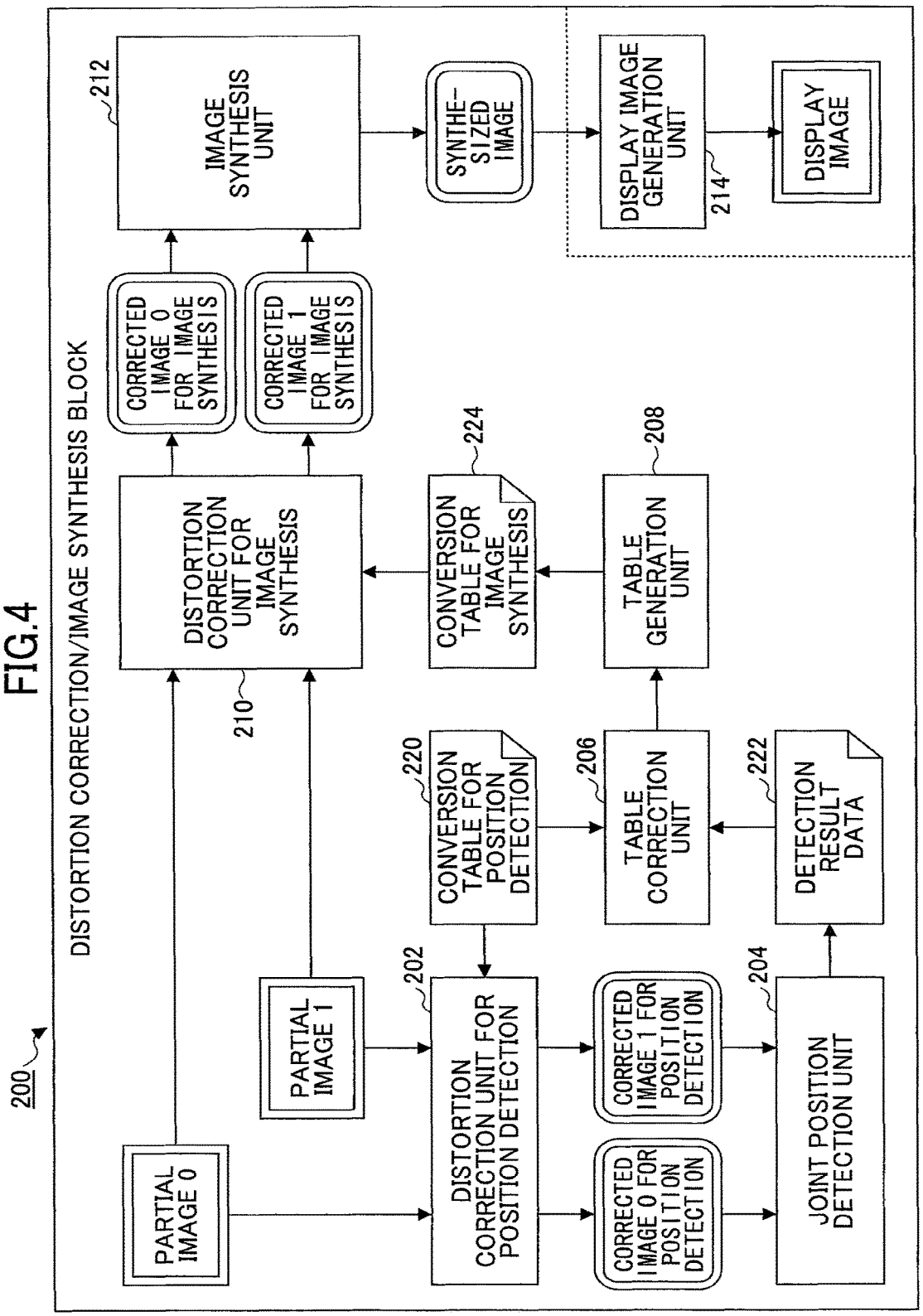
FIG. 4 is a functional block diagram of main blocks in an entire celestial sphere image synthesis process implemented in the entire celestial sphere imaging system according to the first embodiment.

In the following, entire celestial sphere image synthesis functions of the imaging system 10 will be described in detail according to the present embodiment with reference to FIGS. 4-21. FIG. 4 is a functional block diagram 200 of main blocks in an entire celestial sphere image synthesis process implemented in the entire celestial sphere imaging system 10 according to the present embodiment. As illustrated in FIG. 4, the distortion correction/image synthesis block 118 is configured to include a distortion correction unit for position detection 202, a joint position detection unit 204, a table correction unit 206, a table generation unit 208, a distortion correction unit for image synthesis 210, and an image synthesis unit 212.

Also, the distortion correction/image synthesis block 118 receives two partial images as input from the two solid-state image sensing devices 22A-22B after having image signal processing applied at the ISPs 108A-108B, respectively. Note that the number "0" or "1" is attached to distinguish an image from the solid-state image sensing device 22A or 22B: an image having the solid-state image sensing device 22A as the source is referred to as an "partial image 0"; and an image having the solid-state image sensing device 22B as the source is referred to as an "partial image 1". Moreover, the distortion correction/image synthesis block 118 is provide with a conversion table for position detection 220 that has been generated beforehand at a manufacturer or the like, based on design data or the like of the respective lens optical systems, and following a predetermined projection model.

The distortion correction unit for position detection 202 applies distortion correction to the input partial image 0 and partial image 1 using the conversion table for position detection 220 as a preprocess of a joint position detection process, to generate a corrected image for position detection (also simply referred to as a "corrected image" below) 0 and a corrected image for position detection 1. The input partial images 0-1 are captured by the solid-state image sensing devices in which the light reception regions occupy the areas, respectively, which are image data represented by a plane coordinate system (x, y). On the other hand, corrected images having distortion correction applied by using the conversion table for position detection 220 are image data represented by a coordinate system different from that of the input images, or more specifically, the image data of an entire celestial sphere image format represented by a spherical coordinate system (a polar coordinate system having a radius vector of 1 and two arguments $\theta$ and $\varphi$).

Figure 6:
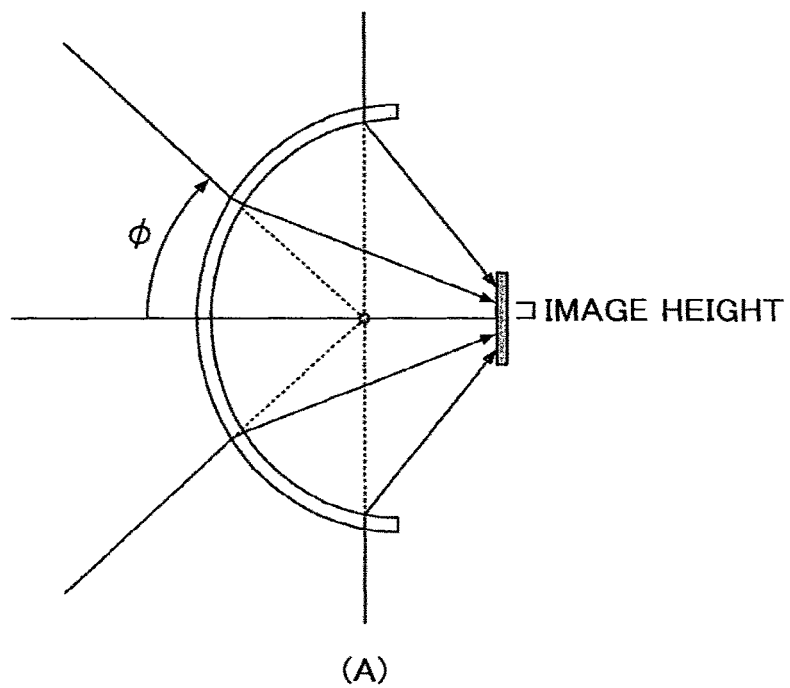
FIG. 6 is a diagram illustrating a projection relationship in the entire celestial sphere imaging system using fisheye lenses.
Figure 6:
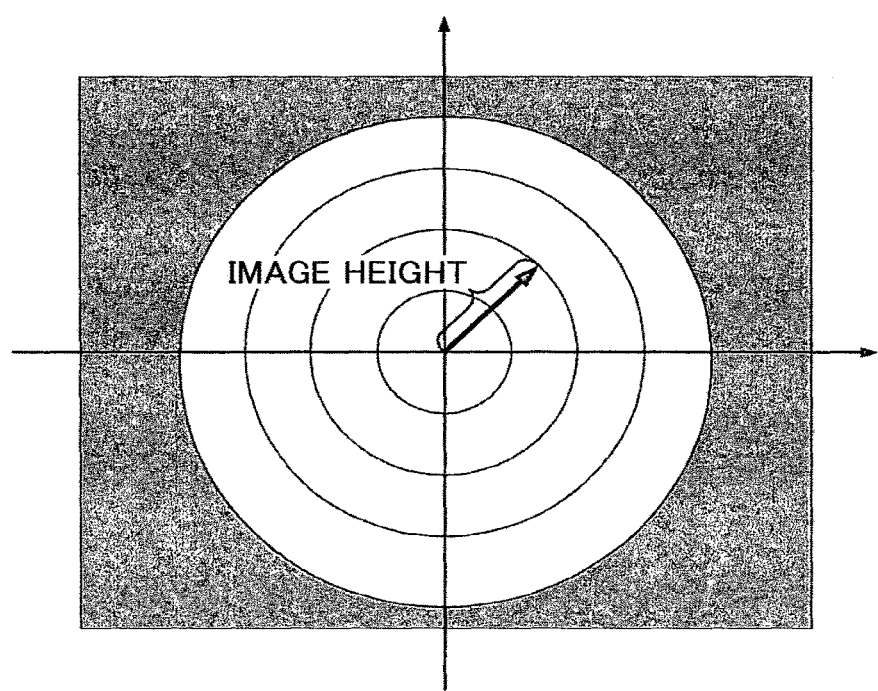

FIG. 6 is a diagram illustrating a projection relationship in an imaging system using fisheye lenses. In the present embodiment, an image captured by a fisheye lens covers a hemisphere azimuth from an imaging point. Also, as illustrated in FIG. 6, the fisheye lens generates an image having the image height h that corresponds to an incident angle $\varphi$ relative to the optical axis. The relationship between the image height h and the incident angle $\varphi$ is determined by a projection function depending on a predetermined projection model. Although the projection function depends on properties of a fisheye lens, for a fisheye lens represented by a projection model called an "equidistant projection method", it is represented by Formula (1) below where f represents a focal distance.

$$h = f \times \phi \quad (1)$$

Other projection models include a center projection method ($h = f \cdot \tan \varphi$), a stereographic projection method ($h = 2f \cdot \tan(\varphi/2)$), an equi-solid-angle projection method ($h = 2f \cdot \sin(\varphi/2)$), and an orthogonal projection method ($h = f \cdot \sin \varphi$). In any of these methods, the image height h of imaging forming is determined corresponding to the incident angle $\varphi$ from the optical axis and the focal distance f. Also, in the present embodiment, a configuration of a so-called "circumferential fisheye lens" is adopted where the image circle diameter is smaller than the image diagonal line, with which the partial image is obtained as a plane image that includes the image circle as a whole on which almost a hemisphere of the captured range is projected as illustrated in FIG. 6(B).

Figure 7:
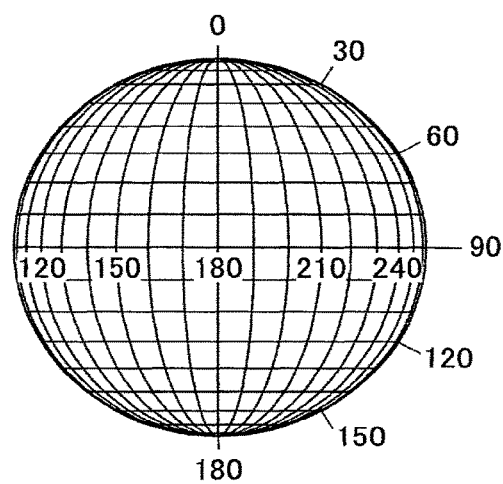
FIG. 7 is a diagram illustrating a data structure of image data in an entire celestial sphere image format used in the first embodiment.
Figure 7:
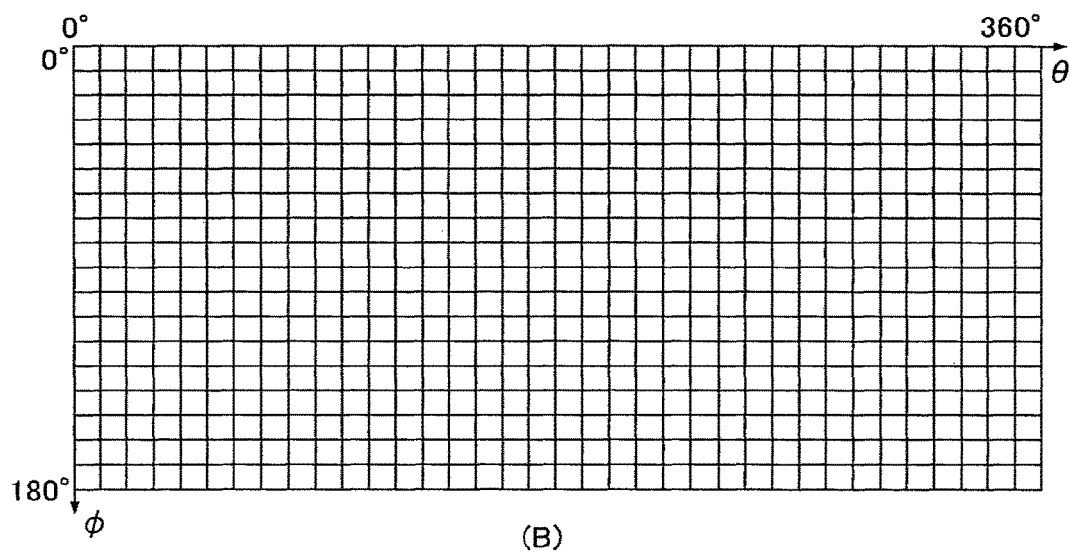

FIG. 7 is a diagram illustrating a data structure of image data in the entire celestial sphere image format used in the present embodiment. As illustrated FIG. 7, the image data in the entire celestial sphere image format is represented by an array of pixel values having coordinates of a vertical angle $\varphi$ that corresponds to an angle relative to a predetermined axis, and a horizontal angle $\theta$ that corresponds to a rotation angle around the axis. The horizontal angle $\theta$ is represented in the range of 0 to 360° (or −180° to +180°), and the vertical angle $\varphi$ is represented in the range of 0 to 180° (or −90° to +90°). Every pair of coordinates values ($\theta$, $\varphi$) is associated with a point on the spherical surface representing omniazimuth having the imaging point as the center, and the omniazimuth is mapped onto the entire celestial sphere image. The relationship between plane coordinates of an image captured by the fisheye lens, and coordinates on the spherical surface in the entire celestial sphere image format can be associated with each other using a projection function as described in FIG. 6.

Figure 8:
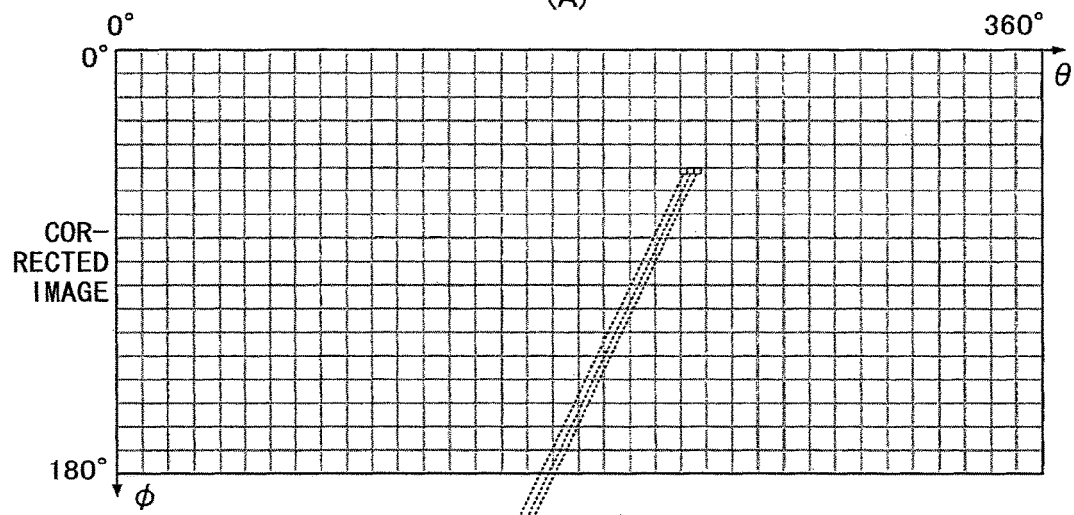
FIG. 8 is a diagram illustrating conversion data that is referred to by a distortion correction unit for position detection and a distortion correction unit for image synthesis.
Figure 8:
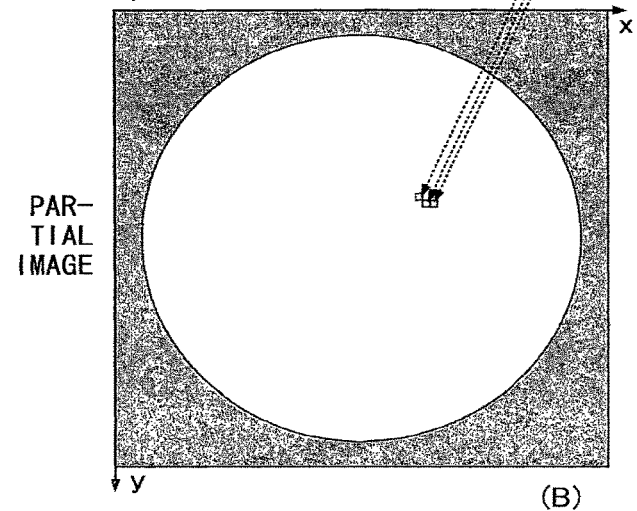

FIG. 8 is a diagram illustrating conversion data that is referred to by the distortion correction unit for position detection 202 and the distortion correction unit for image synthesis 210. Each of the conversion tables 220 and 224 specifies a projection from a partial image represented by the plane coordinate system to an image represented by the spherical coordinate system. As illustrated in FIGS. 8(A)-8(B), the conversion tables 220 and 224 each hold, for each of the fisheye lenses, information associating coordinates values ($\theta$, $\varphi$) of a corrected image with coordinates values (x, y) of a partial image before correction to be mapped to the coordinates values ($\theta$, $\varphi$), for every pair of coordinates values ($\theta$, $\varphi$)($\theta$=0, . . . , 360°, $\varphi$=0, . . . , 180°). In the example in FIG. 8, one pixel covers an angle of 1/10° both in the $\varphi$ direction and the $\theta$ direction. Therefore, each of the conversion tables 220 and 224 has information of 3600×1800 associations for each of the fisheye lenses.

The conversion table for position detection 220 used for joint position detection has been calculated and generated in a table format beforehand at the manufacturer or the like, based on design data of the lens or the like, and using the projection relationship of the lens described in FIG. 6 to correct distortion from an ideal lens model due to radial distortion, eccentric distortion, and the like. In contrast to this, the conversion table for image synthesis 224 is generated from the conversion table for position detection 220 by a predetermined conversion process as will be described later in detail. Note that, in the present embodiment, conversion data is assumed to be data in which an associative relationship of coordinates values is described in a tabular form. However, other embodiments may use, as conversion data, coefficient data of one or more functions that specify a projection from a partial image (x, y) represented by a plane coordinate system to an image ($\theta$, $\varphi$) represented by a spherical coordinate system.

Referring to FIG. 4 again, the distortion correction unit for position detection 202 refers to the conversion table for position detection 220, converts the partial image 0 and partial image 1, and generates the corrected image for position detection 0 and the corrected image for position detection 1. More specifically, the distortion correction unit for position detection 202 refers to the conversion table for position detection 220 for all coordinates ($\theta$, $\varphi$) in the corrected image after conversion, obtains coordinates (x, y) of a partial image before conversion to be mapped to the coordinates ($\theta$, $\varphi$), to refer to a pixel value at the coordinates (x, y) in the partial image. In this way, a corrected image is generated.

Figure 9:
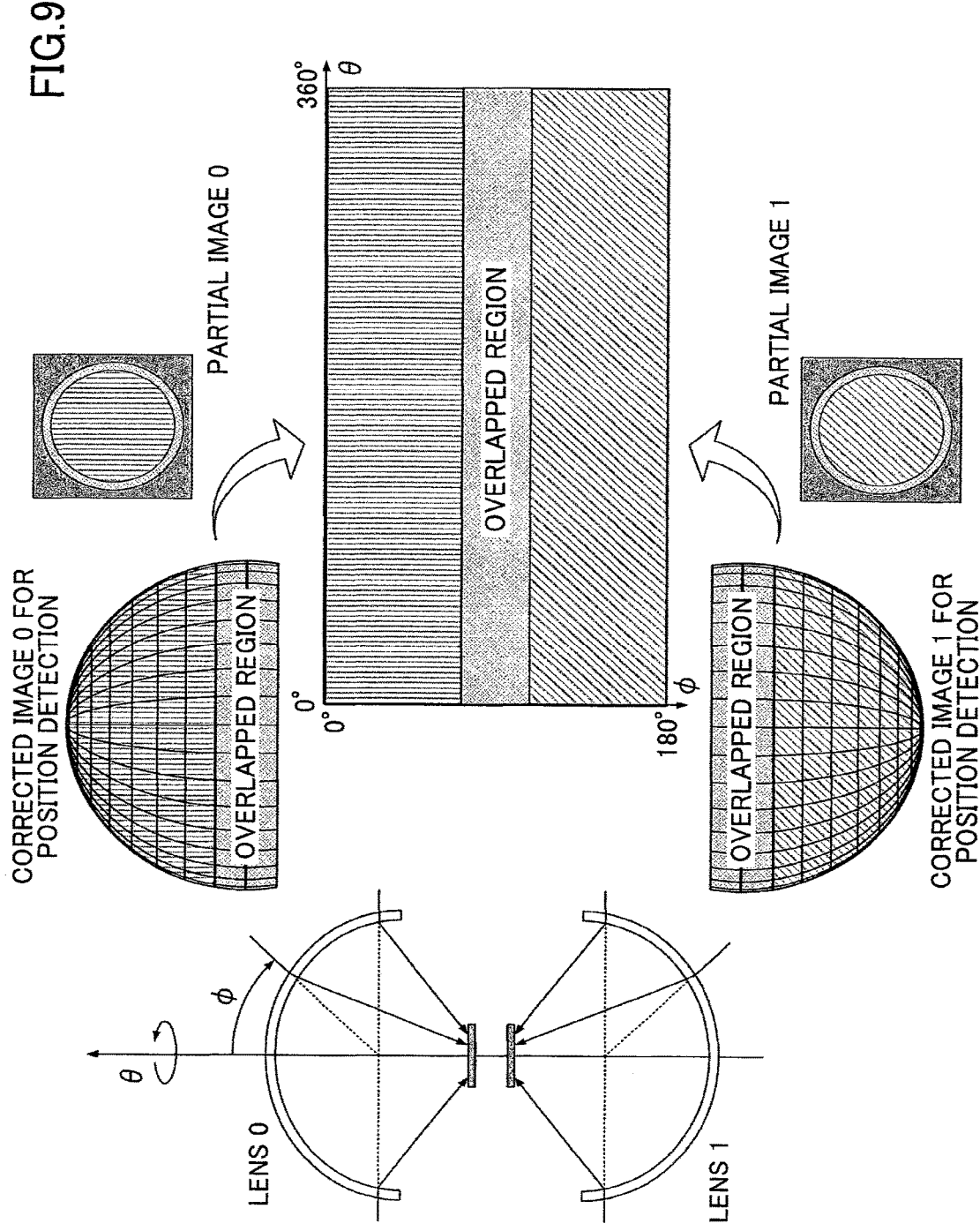
FIG. 9 is a diagram illustrating a mapping of two partial images onto a spherical coordinate system where the images are captured by two fisheye lenses during a position detection process.

FIG. 9 is a diagram illustrating a mapping of two partial images onto the spherical coordinate system where the images are captured by the two fisheye lenses during a position detection process. As a result of the process by the distortion correction unit for position detection 202, the two partial images 0-1 captured by the fisheye lenses are expanded on the entire celestial sphere image format as illustrated in FIG. 9. The partial image 0 captured by the fisheye lens 0 is typically mapped onto about the upper hemisphere of the entire celestial sphere, and the partial image 0 captured by the fisheye lens 1 is mapped onto about the lower hemisphere of the entire celestial sphere. The corrected image 0 and the corrected image 1 represented in the entire celestial sphere format overflow the respective hemispheres because the fisheye lenses have the overall field angles greater than 180°. Consequently, when superposing the corrected image 0 and the corrected image 1, an overlapped region is generated where captured ranges are overlapped between the images.

As will be described later in detail, after correction by the distortion correction unit for position detection 202, joint positions between images are detected in the overlapped region by the joint position detection unit 204. The conversion table for position detection 220 in the present embodiment is created so that, as illustrated in FIG. 9, the optical axes of the two lens optical systems are projected to two poles ($\varphi=0°$ or $180°$) of the spherical surface, the overlapped region between the images is projected in the neighborhood of the equator ($\varphi=90°\pm((\text{overall field angle}-180°)/2)$) of the spherical surface. In the spherical coordinate system, when the vertical angle $\varphi$ is closer to the pole at $0°$ or $180°$, the distortion becomes greater and the precision of joint position detection is degraded. On the other hand, by using the projection described above, joint position detection is performed by having the overlapped region positioned in the neighborhood of the vertical angle of 90° where the distortion amount is small when shifted in the $\theta$ direction, with which the precision of joint position detection can be improved. In addition, joint positions can be detected with high precision even for an image captured by a lens optical system having great distortion.

Referring to FIG. 4 again, the joint position detection unit 204 receives the corrected images 0 and 1 as input, which have been converted by the distortion correction unit for position detection 202, and detects joint positions between the input corrected images 0 and 1 by using a pattern matching process to generate detection result data 222.

When performing pattern matching, it is typically difficult to detect joint positions with high precision if the region to be matched has a flat image, or it is a region where the same pattern is repeated with few characteristics. Thereupon, the joint position detection unit 204 in the present embodiment measures a characteristic amount that indicates a degree of characteristics held by the image of a region to be matched, and adopts a configuration to determine joint positions of the target region that uses the measured characteristic amount. This aims at improving the quality of an obtained entire celestial sphere image.

Figure 10:
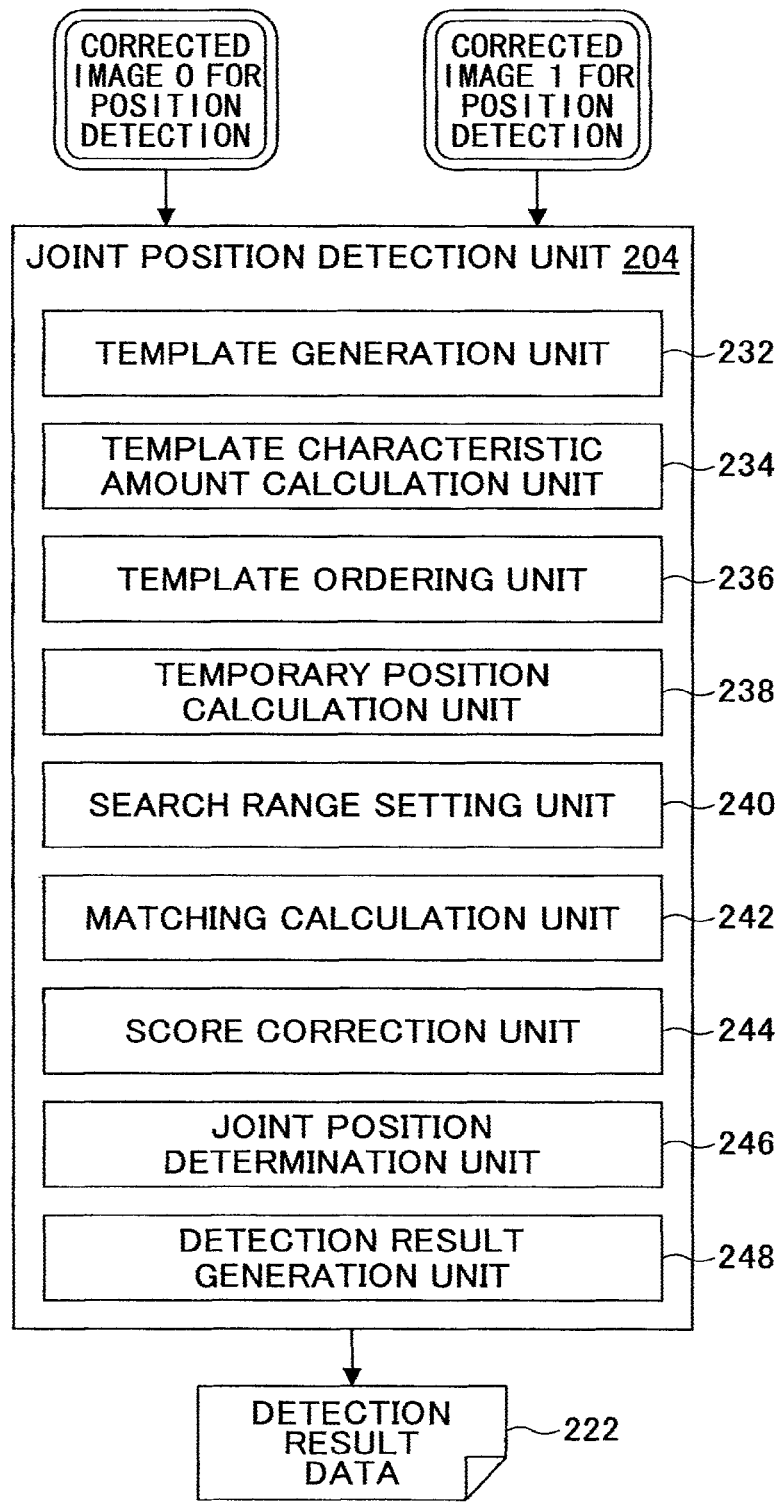
FIG. 10 is a functional block diagram of a joint position detection unit according to the first embodiment.

FIG. 10 is a functional block diagram of the joint position detection unit 204 illustrated in FIG. 4 in according to the present embodiment. In detail, the joint position detection unit 204 illustrated in FIG. 10 is configured to include a template generation unit 232, a template characteristic amount calculation unit 234, a template ordering unit 236, a temporary position calculation unit 238, a search range setting unit 240, a matching calculation unit 242, a score correction unit 244, a joint position determination unit 246, and a detection result generation unit 248. In the following description of a joint position detection process using template matching, it is assumed for the sake of explanation that the corrected image for position detection 1 is a template image, the corrected image for position detection 0 is a search image.

Using the corrected image for position detection 1 as a template image in template matching, the template generation unit 232 generates multiple images to be searched for (referred to as "template images") in the search image from the corrected image for position detection 1. In the joint position detection process by template matching, a joint position in the corrected image for position detection 0 is obtained for each of the template images which are parts of the corrected image for position detection 1. Note that an object here is to obtain joint positions in the overlapped region between the corrected images 0 and 1. Therefore, multiple template images are generated from the overlapped region of the corrected image for position detection 1.

The template characteristic amount calculation unit 234 calculates a characteristic amount for each of the multiple template images generated by the template generation unit 232. The characteristic amount here is a value to quantitatively indicate a degree of characteristics held by a template image. In the present embodiment, a greater characteristic amount means that the image has a greater characteristic, whereas a smaller characteristic amount means that the image has a less characteristic with no individuality. As the characteristic amount, one of the edge amount extracted from a template image, and dispersion and standard deviation calculated from the template image may be used, but it not specifically limited to these.

Figure 11:
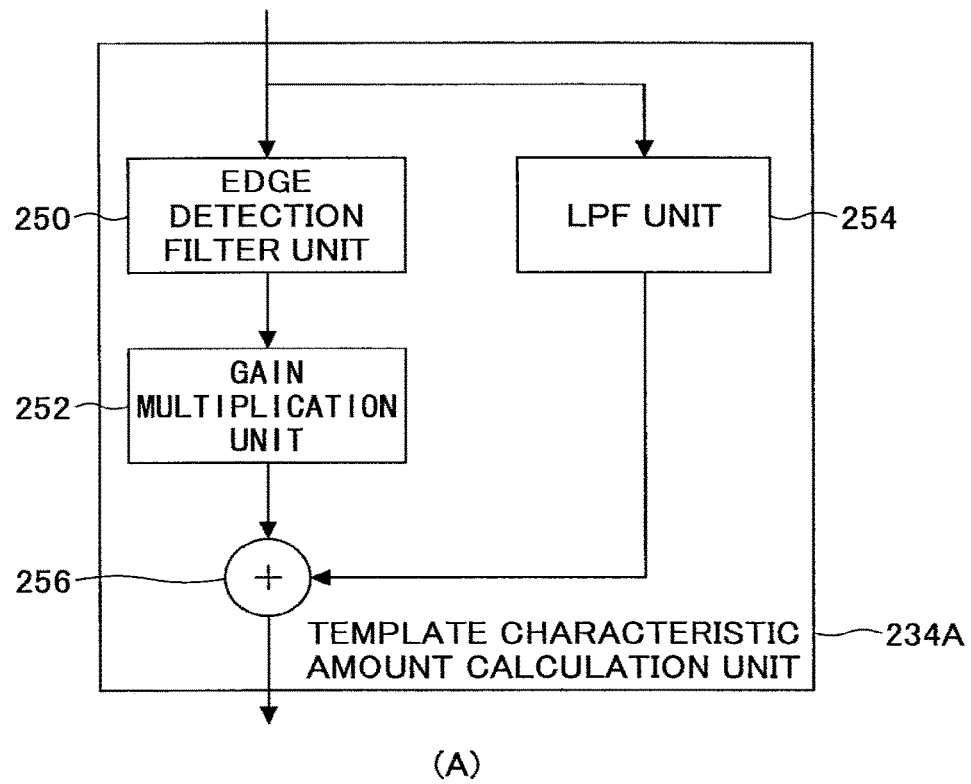
FIG. 11 is a block diagram of a template characteristic amount calculation unit according to a specific embodiment.
Figure 11:
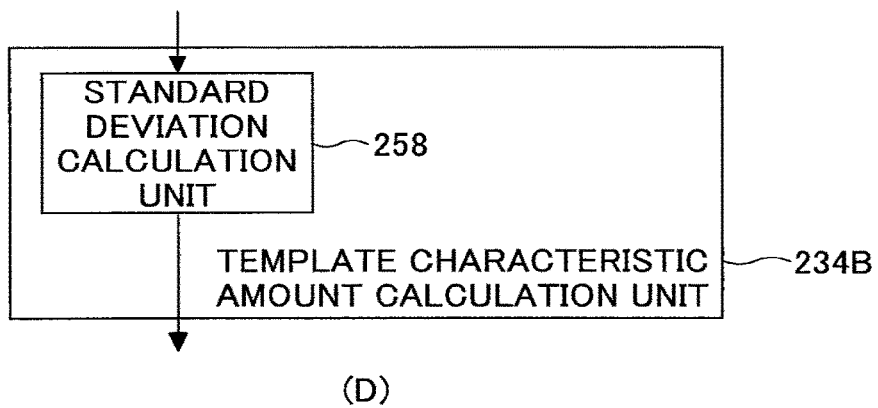

FIG. 11 includes a block diagram of a template characteristic amount calculation unit according to a specific embodiment. FIGS. 11(A) to (C) illustrate a configuration of the template characteristic amount calculation unit 234A according to an embodiment using the edge amount as the indicator. On the other hand, FIG. 11(D) illustrates a configuration of a template characteristic amount calculation unit 234B according to an embodiment using standard deviation or dispersion as the indicator.

When using the edge amount as the characteristic amount of a template image, an edge reinforcement block can be used for performing edge reinforcement as illustrated in FIG. 11(A). The edge reinforcement block illustrated in FIG. 11(A) is configured to include an edge detection filter unit 250, a gain multiplication unit 252, and an LPF (Low-Pass Filter) unit 254. In the edge reinforcement block, the edge amount extracted at the edge detection filter unit 250 is multiplied by gain at the gain multiplication unit 252, to generate a signal having the edge amount adjusted. Then, a signal obtained by adding the adjusted signal and a signal having noise removed by applying an LPF process to the input signal at the LPF unit 254 by an adder 256 is output as the signal having edge reinforcement.

In the present embodiment, only edges need to be extracted. Therefore, for example, by using LPF coefficients illustrated in FIG. 11(C), the signal may be set to zero after having the LPF process applied, and the edge amount may be output that is extracted at the edge detection filter unit 250 using edge extraction filtering coefficients illustrated in FIG. 11(B). By inputting a template image into the edge reinforcement block illustrated in FIG. 11(A), the edge amount of each pixel is output. As the characteristic amount of a template image, the sum of the edge amounts of all pixels in the template may be used, or an average of the edge amounts may be used. A greater sum of the edge amounts of a template image means that the image includes a greater number of locations where brightness changes discontinuously. Therefore, a flat image typically has smaller edge amounts, and a smaller characteristic amount.

When using the standard deviation (or dispersion) as the characteristic amount of a template image, a configuration illustrated in FIG. 11(D) may be used. A standard deviation (or dispersion) calculation unit 258 illustrated in FIG. 11(D) obtains the standard deviation σ (or dispersion σ²) of a template image by the following calculation Formula (2) where N (=W pixels×H pixels) is the total number of pixels in the template image, and T(i, j) is the brightness at coordinates (i, j) of the template image. Greater standard deviation (or dispersion) of the template image means wider distribution of brightness in a histogram. Therefore, a flat image has typically narrower distribution of brightness of an image, and a smaller characteristic amount.

$$\sigma = \sqrt{\frac{\sum_j \sum_i \{T(i,j)\}^2}{N} - \left\{\frac{\sum_j \sum_i T(i,j)}{N}\right\}^2} \quad (2)$$

Note that although standard deviation or dispersion is used as the characteristic amount of a template image in the above example, other indicators may be calculated to be used for characterizing a template image, which include indicators based on the density histogram such as kurtosis of a density histogram obtained from a template image (representing a degree of concentration of the distribution of the histogram around the average value), skewness (representing a degree of skewness of the form of the histogram from a symmetric form), or other statistical indicators such as contrast based on a difference statistic. Also, although the characteristic amount is calculated using brightness in the above description, the characteristic amount may be calculated for each of RGB colors, and their sum may be used as the characteristic amount of a template image. The edge amount, standard deviation, and dispersion are preferably used as the characteristic amount because they can be simply calculated from an object image with a low calculation cost and a favorable detection result. However, it is not limited to these, but any indicator may be used as long as it indicates a degree of the characteristic held by an image.

Referring to FIG. 10 again, the template ordering unit 236 determines processing order of multiple template images based on the characteristic amounts calculated at the template characteristic amount calculation unit 234, to specify a relative relationship of the characteristic amounts among the template images.

The temporary position calculation unit 238 selects a template image of interest among the multiple generated template images, and calculates a temporary position of the template image of interest that is used as a reference in the template matching process as will be described later. Here, the temporary position is calculated based on the relative relationship of the characteristic amounts between the template image of interest and each of the peripheral template images in the neighborhood of the corrected image for position detection 1.

Template matching is a process to search for one of the template images to be searched for in the search image. If a region that may correspond to the template image is identified to a certain extent, the search range in the search image may be restricted. The search range setting unit 240 sets a search range for template matching based on the relative relationship of the characteristic amounts between the template image of interest and each of the peripheral template images. Typically, a predetermined search range is set in the image 0 for position detection, around the temporary position calculated by the temporary position calculation unit 238. Also, the search range may be further narrowed down based on joint positions that have already been determined for other peripheral template images.

For the template image of interest, the matching calculation unit 242 calculates matching between the template image of interest and parts in the corrected image for position detection based on the calculated temporary position by typically using a template matching method. When calculating the matching, the template image is moved in the search range centered around the temporary position set by the search range setting unit 240, and matching score is calculated that is an evaluation value based on similarity of the images at positions.

For the template image of interest, the score correction unit 244 executes an offset correction for the score based on the similarity of the images calculated by the matching calculation unit 242, to prioritize the score around the calculated temporary position. In this way, the score is calculated that considers the temporary position calculated based on the relative relationship of the characteristic amounts between the template images.

The joint position determination unit 246 determines a joint position at which the corrected score in the corrected image for position detection 0 is maximized for the template image of interest. The determined joint position here is affected by the joint position of the peripheral template image having a greater characteristic amount than the template image of interest.

When the processes by the temporary position calculation unit 238, the search range setting unit 240, the matching calculation unit 242, the score correction unit 244, and the joint position determination unit 246 are executed for the multiple template images, the joint positions are obtained in the corrected image for position detection 0 that correspond to the respective template images. Based on a data set of the joint positions corresponding to the obtained template images, the detection result generation unit 248 calculates joint positions of pixels (θ, φ) in the entire celestial sphere format, and generates detection result data 222.

Referring to FIG. 4 again, based on the detection result data 222, the table correction unit 206 applies a correction to the conversion table for position detection 220 prepared in advance, and transfers it to the table generation unit 208. The table generation unit 208 generates the conversion table for image synthesis 224 from the conversion data corrected by the table correction unit 206 based on rotational coordinate transformation.

As a preprocess of an image synthesis process, the distortion correction unit for image synthesis 210 applies distortion correction to the original partial image 0 and partial image 1 using the conversion table for image synthesis 224, and generates the corrected image for image synthesis 0 and the corrected image for image synthesis 1. The generated corrected image for image synthesis is represented by the spherical coordinate system, similarly to the corrected image for position detection. On the other hand, the coordinate axes are defined differently from those for the corrected image for position detection due to the rotational coordinate transformation. The image synthesis unit 212 synthesizes the obtained corrected image for image synthesis 0 and corrected image for image synthesis 1, and generates a synthesized image in the entire celestial sphere image format. Note that the process executed by the joint position detection unit 204, the table correction unit 206, the table generation unit 208, the distortion correction unit for image synthesis 210, and the image synthesis unit 212 will be described later in detail along with the description of the process flow.

The functional block 200 illustrated in FIG. 4 may further include a display image generation unit 214. The generated synthesized image is represented in the entire celestial sphere image format. Therefore, if it is displayed as it is on a flat display device such as an LCD display, the image is displayed distorted more when approaching the vertical angle 0° or 180°. The display image generation unit 214 is a unit to execute image processing to project an entire celestial sphere image on a flat display device. The display image generation unit 214 can execute conversion for a synthesized image in the entire celestial sphere image format, for example, from a spherical coordinate system into a plane coordinate system having a specific direction and a specific field angle, and can execute a process to project it as an image in a specific viewing direction with a certain field angle specified by a user.

[Flow of Entire Celestial Sphere Image Synthesis Process]

Figure 5:
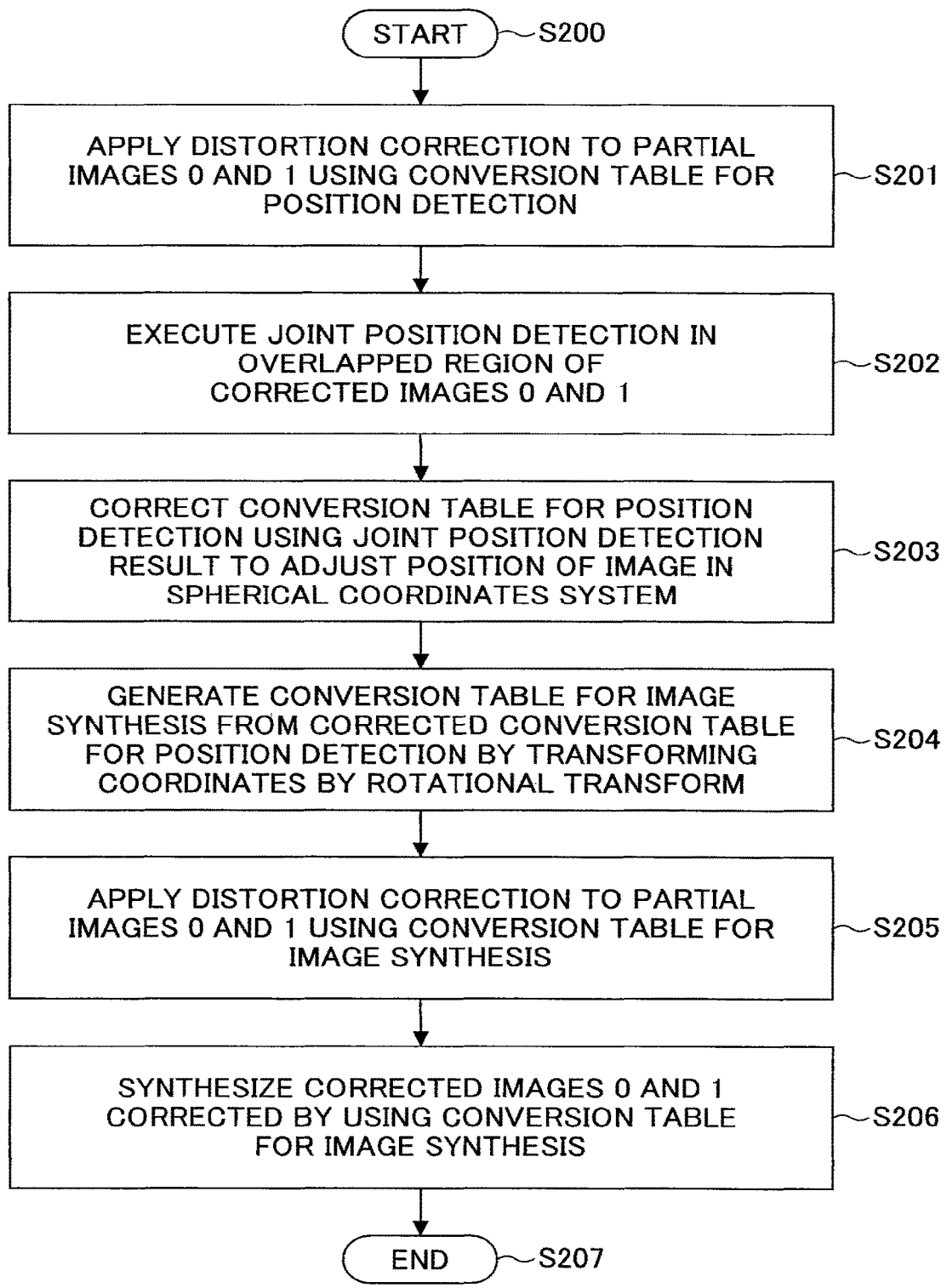
FIG. 5 is a flowchart of the entire celestial sphere image synthesis process as a whole executed by the entire celestial sphere imaging system according to the first embodiment.

In the following, a flow of the entire celestial sphere image synthesis process will be described according to the present embodiment with reference to FIGS. 5, 12 and 20. FIG. 5 is a flowchart of the entire celestial sphere image synthesis process as a whole executed by the imaging system 10 according to the present embodiment. The process illustrated in FIG. 5 starts at Step S200 in response to a command issued at the CPU 130, for example, when the shutter button 18 is pressed to give an instruction of imaging by the two imaging optical system.

At Step S201, the imaging system 10 has the distortion correction unit for position detection 202 apply distortion correction to the partial images 0 and 1 obtained by the two solid-state image sensing devices 22A-22B, using the conversion table for position detection 220. Thus, the corrected image for position detection 0 and the corrected image for position detection 1 are obtained. Namely, the corrected images are obtained in the entire celestial sphere image format illustrated in FIG. 9. At Step S202, the imaging system 10 has the joint position detection unit 204 execute joint position detection between the images in overlapped regions of the corrected image for position detection 0 and the corrected image for position detection 1.

Figure 12:
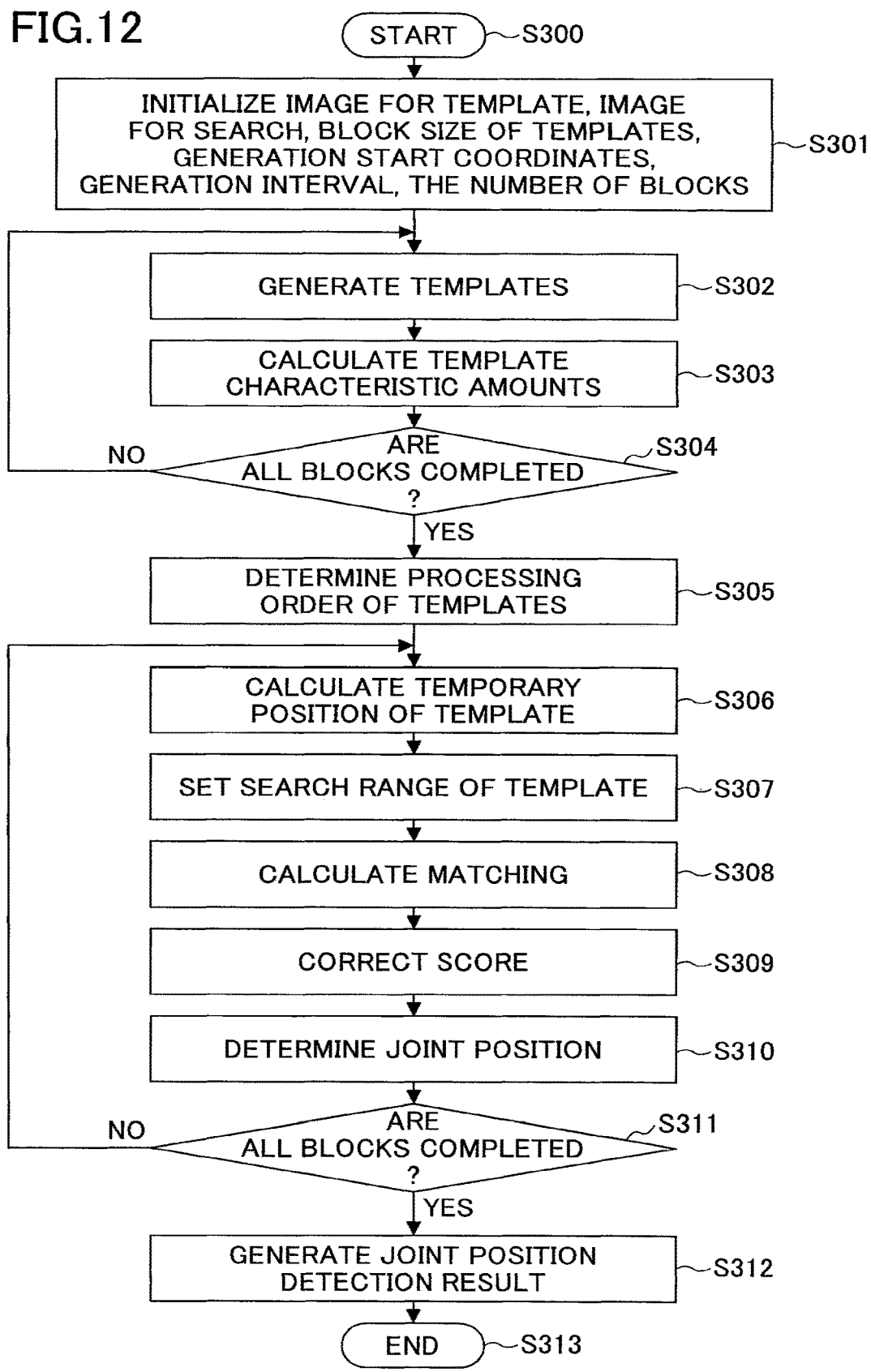
FIG. 12 is a flowchart of a joint position detection process executed by the entire celestial sphere imaging system according to the first embodiment.

FIG. 12 is a flowchart of the joint position detection process executed by the imaging system 10 according to the present embodiment. The process illustrated in FIG. 12 is called at Step S202 illustrated in FIG. 5, and starts at Step S300. At Step S301, the imaging system 10 executes initial setting for template images, a search image to be searched, the block size of the templates, generation start coordinates of the templates, a generation interval, and the total number of blocks.

Figure 13:
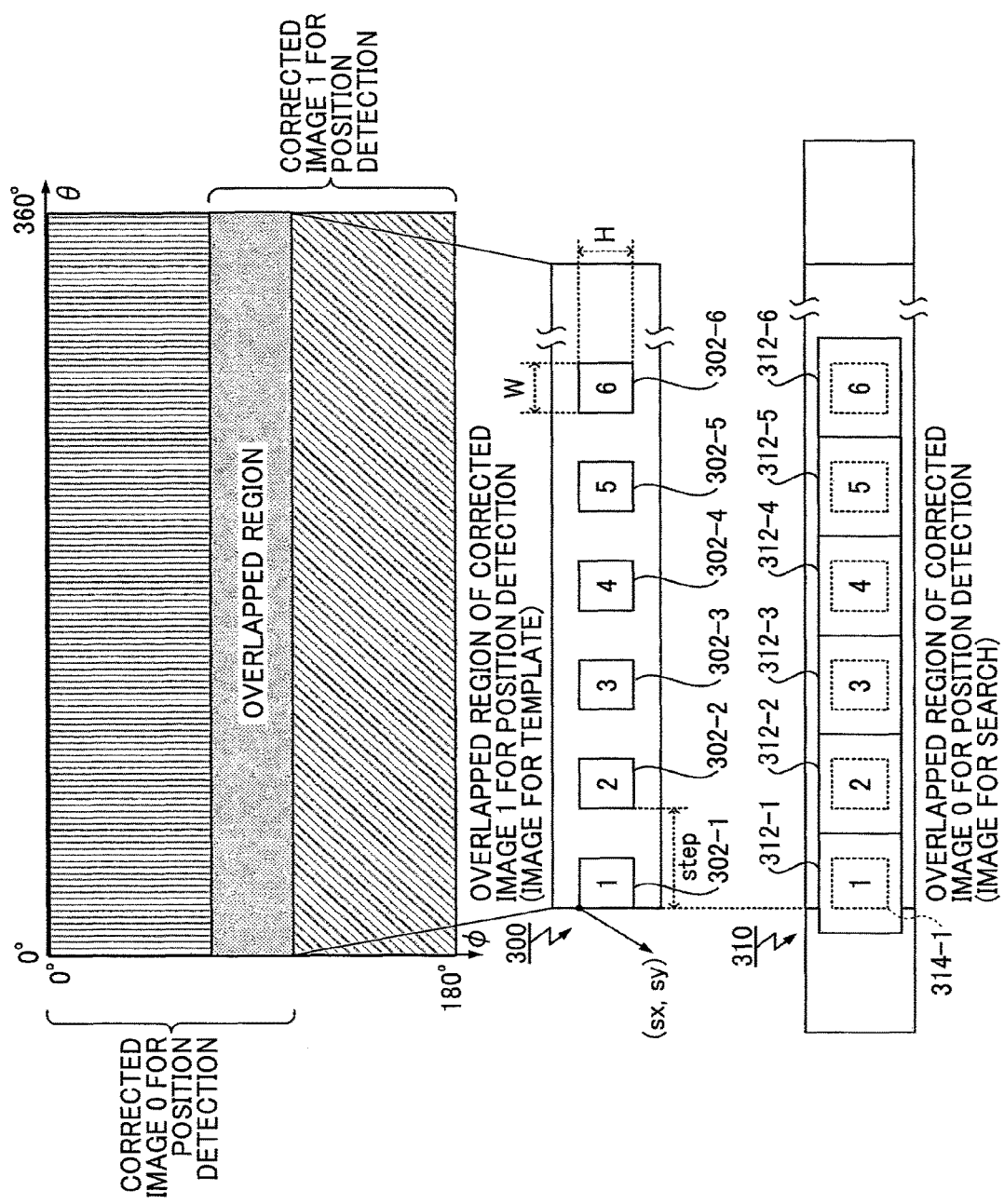
FIG. 13 is a diagram illustrating a generation method of a template image by a template generation unit according to the first embodiment.
Figure 14:
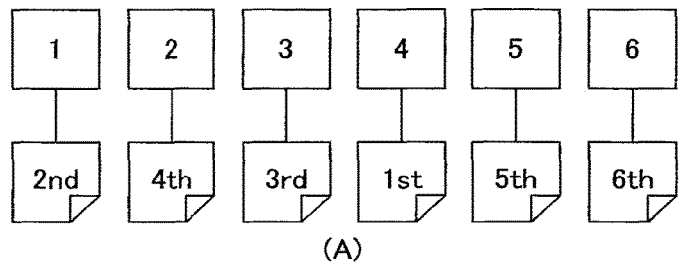
FIG. 14 includes diagrams illustrating (A) ordering of template images according to the first embodiment; and (B, C) a calculation method of temporary positions of template images based on the ordering executed by a temporary position calculation unit according to the first embodiment.
Figure 14:
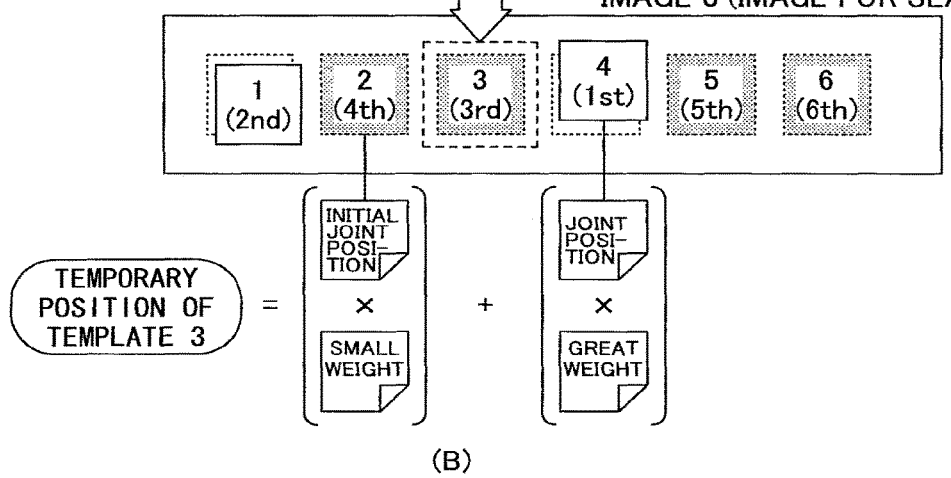
Figure 14:
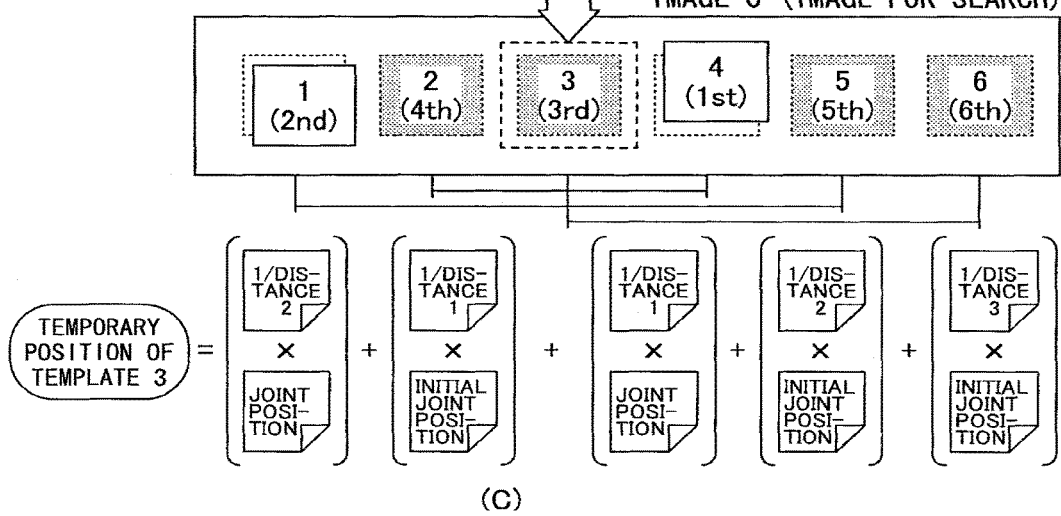

FIG. 13 is a diagram illustrating a generation method of a template image by the template generation unit 232 according to the present embodiment. In the present embodiment, a template image 300 is an image of a part of the overlapped region in the corrected image for position detection 1, and a search image 310 is an image of a part of the overlapped region in the corrected image for position detection 0. The block size is the number of pixels that constitute a template image, and the generation interval is an interval between generation of adjacent template images. The generation start coordinates are coordinates of a first template image to be cut off. Note that the block size and the generation interval may be determined by considering desired precision and a processing amount for piecing images together.

Assuming that the block size is W pixels x H pixels, the generation start coordinates are (sx, sy), and the generation interval is "step" pixels, multiple template images 302-1 to 302-# are generated as illustrated in FIG. 13. The number of blocks # of generated templates takes an integer value obtained by dividing the horizontal directional size of the template image 300 (the width of the entire celestial sphere format=3600 pixels in the present embodiment) by the generation interval "step".

For the multiple template images 302-1 to 302-# generated here, corresponding parts 314 in the search image 310 are searched for in predetermined search ranges 312. Note that both ends in e coordinates (at 0° and 360°) in the entire celestial sphere image format are connected with each other. Therefore, when generating a template image and executing template matching, a part beyond the right end can be treated as the left end, and a part beyond the left end can be treated as the right end.

Referring to FIG. 12, template images are generated based on current coordinates (sx, sy) at Step S302. In a first time loop, a template image is generated by cutting off a region having the block size of (W pixels×H pixels) at the generation start coordinates (sx, sy) initially set at Step S301. After the first template image has been generated, the coordinates are updated to (sx+step, sy) for template generation for loops for a second time and after, and similarly, a region having the block size at the updated coordinates is specified to generate next template images. When a template image is generated, the generated template image is assigned a template number (simply referred to as a "number") as schematically illustrated in FIG. 13. Note that it is not a restriction, but it is assumed that template images are generated for one row in the overlapped region for one round in θ direction in the present embodiment.

At Step S303, the imaging system 10 calculates the template characteristic amount from the template image generated at Step S302. At Step S304, the imaging system 10 determines whether all blocks to be generated have been processed. If it is determined that not all blocks to be generated have been processed (NO) at Step S304, the process loops back to Step S302 to generate a next template image and to calculate its characteristic amount. On the other hand, if it is determined that all blocks to be generated have been processed (YES) at Step S304, the process branches to Step S305.

At Step S305, the imaging system 10 determines processing order of all template images in descending order of the characteristic amount. Thus, the processing order is determined for Steps S306 and after. FIG. 14(A) is a diagram illustrating ordering of the template images according to the present embodiment. As illustrated in FIG. 14(A), the template order is given to each of the numbered template images in descending order of the characteristic amount. The process of Steps S306 to S311 illustrated in FIG. 12 is executed for the template images based on the order determined at Step S305, starting from the template image having the highest rank.

Referring to FIG. 12, at Step S306, the imaging system 10 calculates a temporary position for the template image of interest as the target of the process. FIG. 14(B) is a diagram illustrating a first calculation method of the temporary position of a template image based on the ordering, executed by the temporary position calculation unit 238 according to the present embodiment. In the first calculation method, a joint position is first obtained that is set to a peripheral template image positioned in the neighborhood of the template image of interest.

In the present embodiment, template images are generated for a row in the overlapped region in the θ direction, and assigned template numbers from the left side; and hence, an adjacent relationship can be distinguished by the numbers. In the example illustrated in FIG. 14(B), joint positions are obtained for template images (assigned the numbers 2 and 4 in the FIG.), which are positioned before and after the template image of interest (assigned the number 3 in the FIG.). Each of the template images has been assigned the template order at Step S305 in FIG. 12, and the process of Steps S306 to S311 in FIG. 12 to detect a joint position are executed starting from a template image having the higher rank. Therefore, the joint positions have been already determined for the template images having the greater characteristic amounts and higher ranks than the template image of interest.

Therefore, in the example in FIG. 14(B), as the template image of interest (number 3) has the third rank, the joint positions have been already determined for the template images of the first and second template ranks (assigned the number 4 and the number 1). On the other hand, the joint positions have not been determined for the template images of the fourth to sixth template rank (assigned the numbers 2, 5, and 6) as illustrated in reversal in FIG. 14(B), to which the initial joint position of (0, 0) is set. Note that the joint position of the template image of interest (number 3) is set to the initial joint position (0, 0) for the moment. The joint position represents a shift amount between the coordinates of the template image in the overlapped region of the corrected image 1 and the coordinates of the corresponding region in the overlapped region of the corrected image 0. The joint position (0, 0) means that the template image is jointed at the coordinate position in the corrected image 1 as it is.

Therefore, in the example in FIG. 14(B), as the joint positions of the peripheral template images, the determined joint position of the template image (number 4 in the FIG.) on the right side of the template image of interest (number 3 in the FIG.), and the initial joint position of the template image (number 2 in the FIG.) at the left side are obtained.

Next, the joint positions of the obtained peripheral template images may be averaged to set the average value as the temporary position of the template of interest. At this moment, a simple arithmetic mean may be calculated as the average. Preferably, a weighted average may be calculated by giving different weights to a determined joint position and an undetermined joint position (initial joint position), respectively. Specifically, the weight of a determined joint position may be set greater so that it has a greater influence.

The temporary position $(tx_i, ty_i)$ of a template image of interest (number i) may be calculated by Formula (3) below. In Formula (3), $(x_{i-1}, y_{i-1})$ represents the joint position of the template image (number i−1) at the left side, $w_-$ represents its weight, $(x_{i+1}, y_{i+1})$ represents the joint position of the template image (i+1) at the right side, and $w_+$ represents its weight. $w_-$ or $w_+$ is a weight representing whether the joint position of the adjacent template image is undetermined or determined.

$$tx_i = \frac{w_- \times x_{i-1} + w_+ \times x_{i+1}}{w_- + w_+}, \quad ty_i = \frac{w_- \times y_{i-1} + w_+ \times y_{i+1}}{w_- + w_+} \quad (3)$$

$$w_- = \begin{cases} w_H & \text{if } (x_{i-1}, x_{i-1}) \text{ IS DETERMINED} \\ w_L & \text{if } (x_{i-1}, x_{i-1}) \text{ IS NOT DETERMINED} \end{cases}$$

$$w_+ = \begin{cases} w_H & \text{if } (x_{i+1}, x_{i+1}) \text{ IS DETERMINED} \\ w_L & \text{if } (x_{i+1}, x_{i+1}) \text{ IS NOT DETERMINED} \end{cases}$$

In the example in FIG. 14(B), assuming that, for example, the weight coefficient $w_H$ is "0.7", the weight coefficient for the undetermined $w_L$ is "0.3", the joint position of the determined template number 4 is (2, −2), and the joint position of the undetermined template number 2 is the initial value (0, 0), then, the temporary position of the template image of interest (number 3) is (1.4, −1.4) by Formula (3).

FIG. 14(C) is a diagram illustrating a second calculation method of the temporary position of a template image based on the ordering, executed by the temporary position calculation unit 238 according to the present embodiment. In the second calculation method illustrated in FIG. 14(C), first, for each peripheral template image of the template image of interest, the distance from the template image of interest and the set joint position are obtained. For those having joint positions undetermined, the initial joint position (0, 0) is obtained as above. The distance between template images may be simply measured units of block numbers. For example, the template in interest has the template number 3 in FIG. 14(C). Therefore, it has the distance 1 to the template images of the numbers 2 and 4, the distance 2 to the template images of the number 1 and 5, and the distance 3 to the template images of the number 6.

Next, the joint positions of the obtained peripheral template images may be averaged using the distances as weights to set the average value as the temporary position of the template of interest. For weighting based on the distance, a function may be used that takes a greater value for a smaller distance. For example, the reciprocal of the distance (1/distance) may be used as the weight.

Denoting the temporary position of the template image of interest (number i) by $(tx_i, ty_i)$, the joint positions of the template images by $(x_j, y_j)$ (number j=1 to N), and the distances by $D_{ij}$, the temporary position $(tx_i, ty_i)$ can be calculated by Formula (4) below. Using the second calculation method illustrated in FIG. 14(C), joint positions of template images other than immediately adjacent ones are taken into consideration. Therefore, continuity with the peripheral images can be favorably maintained. Note that although it is assumed that the distance and joint position is obtained for every peripheral template image of the template image of interest, template images having a predetermined distance or greater may be excluded.

$$tx_i = \frac{\sum_j \left(x_j \times \frac{1}{D_{ij}}\right)}{\sum_j \left(\frac{1}{D_{ij}}\right)}, ty_i = \frac{\sum_j \left(y_j \times \frac{1}{D_{ij}}\right)}{\sum_j \left(\frac{1}{D_{ij}}\right)} \quad (4)$$

Note that, in the above description, the weight is used to represent whether the adjacent template image has an undetermined or determined joint position, or to represent the distance between template images. However, the calculation method is not limited to those described above, which are just examples. Other embodiments may execute weighting that depends on whether the adjacent template image has an undetermined or determined joint position, and the distance between template images.

Figure 15:
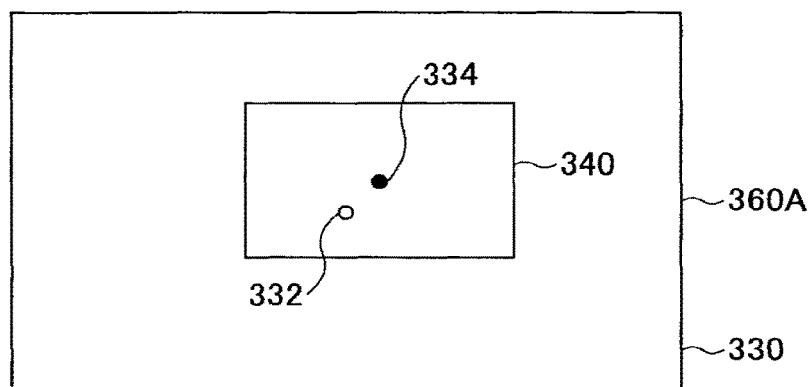
FIG. 15 includes diagrams illustrating a setting method of a search range executed by a search range setting unit according to the first embodiment.
Figure 15:
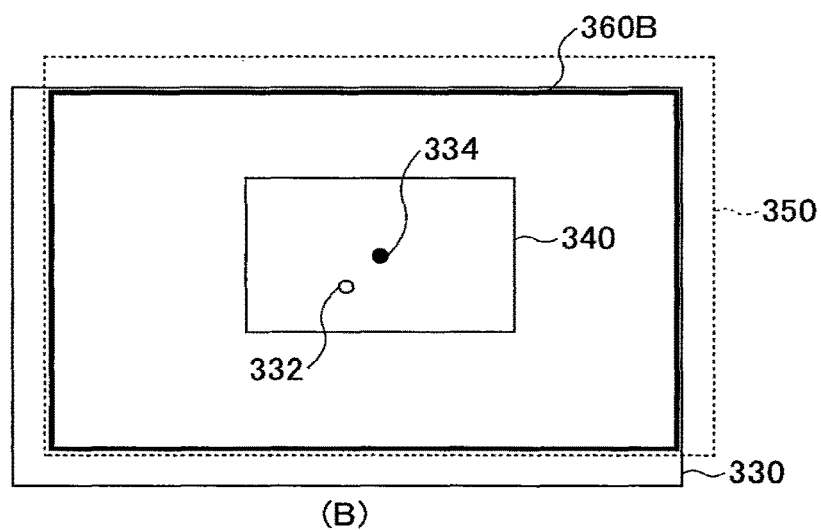
Figure 15:
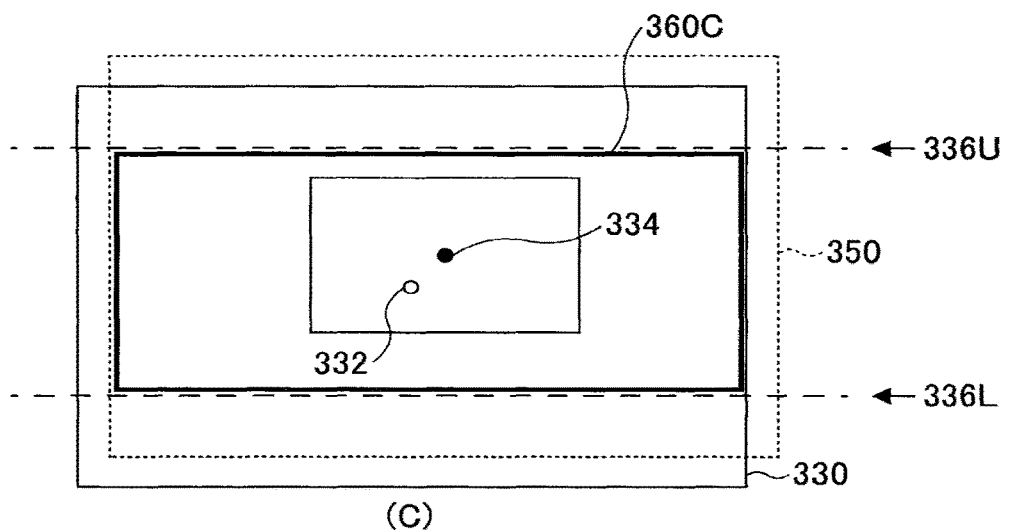

Referring to FIG. 12 again, at Step S307, the imaging system 10 sets a search range in the search region where template matching is to be executed. FIG. 15 includes diagrams illustrating a setting method of a search range executed by the search range setting unit 240 according to the present embodiment. Template matching cuts off a search region having a predetermined size in the search image for the template image of interest. The image 0 for position detection as the search image and the image 1 for position detection as the template image have been generated by the conversion table for position detection defined in advance, and hence, they are superposed with a certain level of precision. Therefore, it is expected that a part corresponding the template image is found in the neighborhood of the corresponding coordinates in the corrected image 0, and a search region is cut off using the coordinates as references. The search range is a range where template matching is executed. Matching with the image of the search region is executed by shifting the position of the template image vertically and horizontally within the search range. Therefore, the process time gets longer when the search range is greater.

FIG. 15(A) illustrates a setting method of a usual search range where a search region 330 having the initial position (a white circle 332 equivalent to the coordinates of the template image) at the center is set as the search range 360A as it is. In this case, the search region 330 is equivalent to the search range 360A, and matching calculation needs to be executed all over the search region 330.

In contrast to this, FIG. 15(B) illustrates a setting method where a search range is set based on a calculated temporary position. Usually, a determined temporary position (denoted by a black circle in the FIG.) 334 is moved from the initial position (denoted by a white circle in the FIG.) 332 due to an influence of a characteristic template. Therefore, the search region is moved (350) around the temporary position 334 (black circle) as the center to set a region overlapped with the original search region 330 as a search range 360B, which makes the search range narrower and the process time shorter.

FIG. 15(C) illustrates a setting method where a search range is set based on a determined joint position of an adjacent template image. Similarly to the method illustrated in FIG. 15(B), the search region is moved (350) around the determined joint position (black circle) as the center to obtain a region overlapped with the original search region 330. Next, referring to the determined joint position of the adjacent template image, a search range 360C is determined, which is further narrowed down. For example, if the joint positions of adjacent template images at both sides are determined, the joint position of the template in interest may be in the range between those. Therefore, as in FIG. 15(C), using the joint positions 336U and 336L in the vertical direction of the template images at both sides, the search range 360B is restricted in the vertical direction, and the process time is further shortened.

Referring to FIG. 12 again, at Step S308, the imaging system 10 calculates matching by shifting the template image in the vertical direction and the lateral direction in the search range set at Step S307 within the search region, to obtain a score of similarity.

Figure 16:
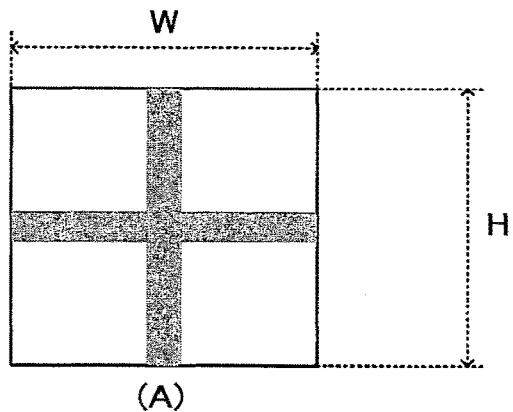
FIG. 16 includes diagrams illustrating (A) a template image; and (B) a process of searching for a template image in a search range by pattern matching.
Figure 16:
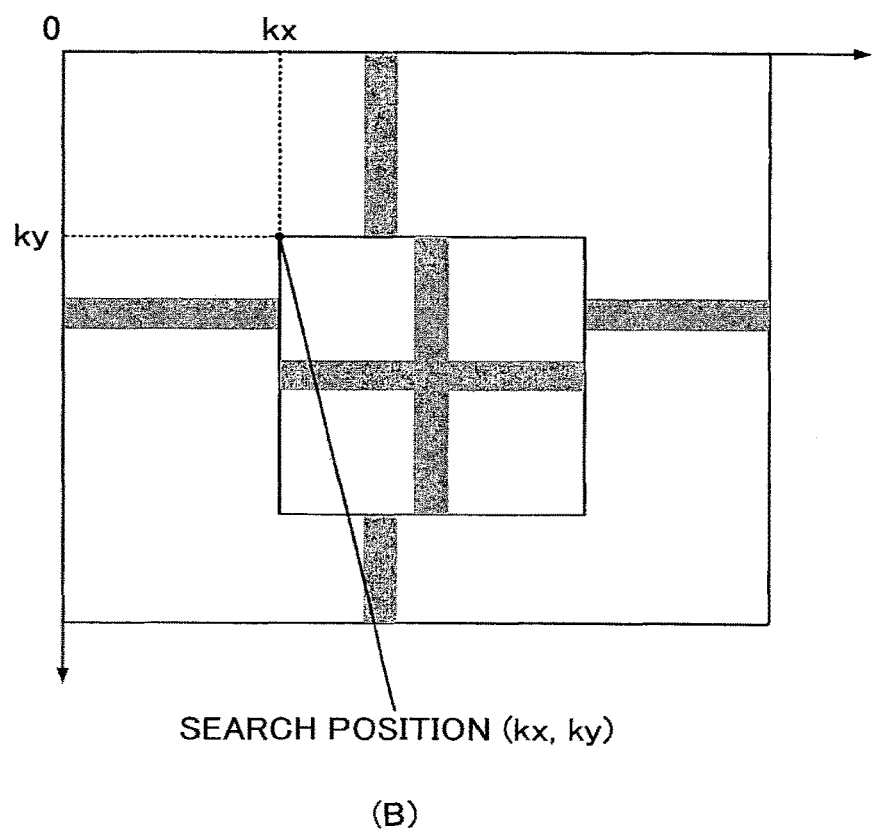
Figure 17:
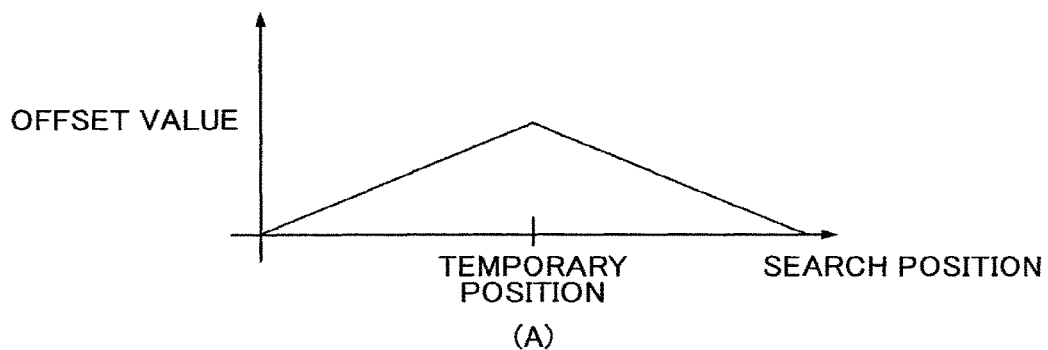
FIG. 17 includes diagrams illustrating (A) a graph of an offset function; and (B, C) graphs of scores before correction and scores after correction plotted with search positions, along with matching positions based on scores before correction and matching positions based on scores after correction.
Figure 17:
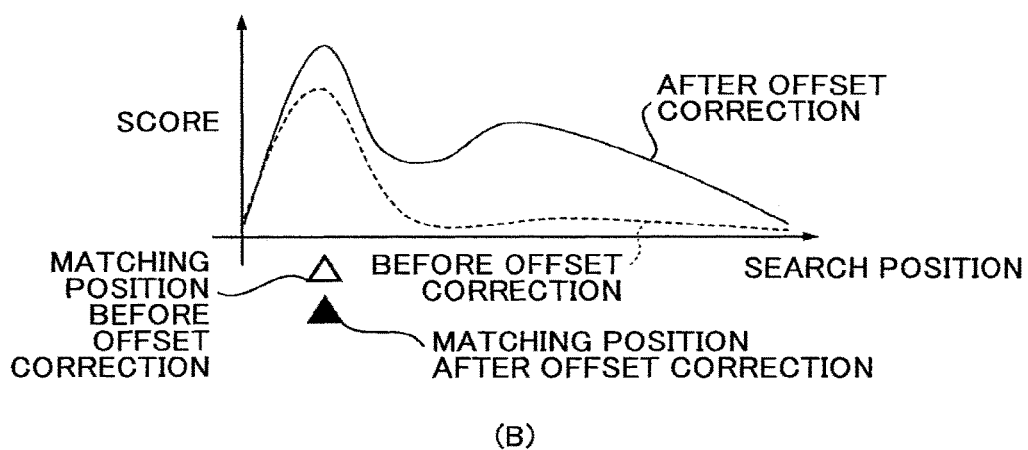
Figure 17:
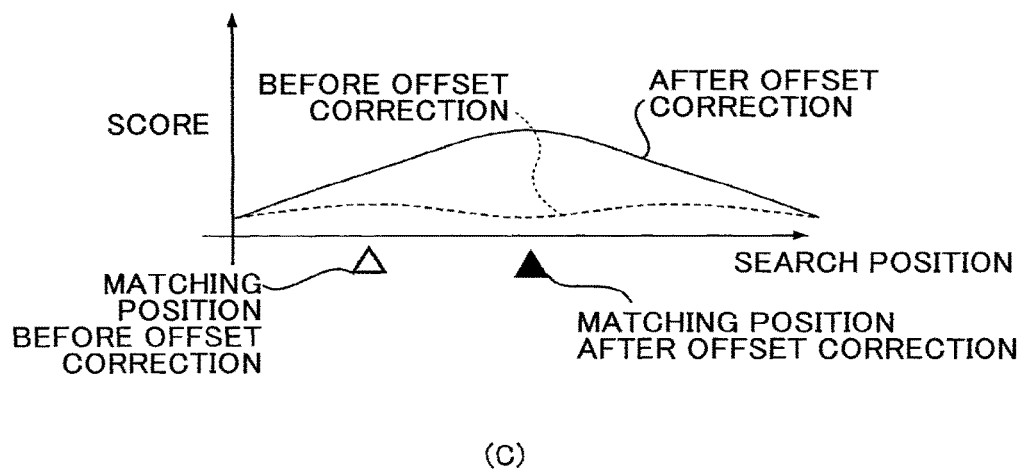

In the following, a zero-mean normalized cross-correlation (ZNCC) method will be described as an example of template matching with reference to FIG. 16. FIG. 16 includes diagrams illustrating (A) a template image; and (B) a process of searching for a template image in a search range by pattern matching. Here, N represents the total number of pixels in a template (=W pixels×H pixels), and (kx, ky) represents a search position in the search range. Denoting the brightness at coordinates (i, j) in the template image by T(i, j), and the brightness in a search image by S(kx+i, ky+j) when the search position (kx, ky) is set to the reference coordinates (0, 0), matching score M(kx, ky) by the ZNCC method can be obtained by Formula (5) below. Note that although the search position (kx, ky) is set at the upper left of the template image in FIG. 16, the coordinates are not specifically limited, but may be set at the center of the template image.

$$M(kx, ky) = \frac{N \sum_j \sum_i S(kx+i, ky+j)T(i,j) - \sum_j \sum_i S(kx+i, ky+j) \times \sum_j \sum_i T(i,j)}{\sqrt{\left(N \sum_j \sum_i \{S(kx+i, ky+j)\}^2 - \left\{\sum_j \sum_i S(kx+i, ky+j)\right\}^2\right) \times \left(N \sum_j \sum_i \{T(i,j)\}^2 - \left\{\sum_j \sum_i T(i,j)\right\}^2\right)}} \quad (5)$$

If the score M(kx, ky) is 1, it is complete matching, or if the score is −1, it is a negative-positive reversal. A higher score M(kx, ky) indicates higher similarity with the template image. As illustrated in FIG. 16(B), template matching is executed by shifting the template image vertically and horizontally within the search range, and matching score M(kx, ky) is calculated at each search position.

Note that the ZNCC method mentioned above can absorb fluctuation of the gain of an image, and can absorb fluctuation of the average brightness of image. Although the ZNCC method is favorable in these points, the calculation method of the score M(kx, ky) is not limited to the ZNCC method. Other embodiments may adopt an SSD (Sum of Square Difference) method, an SAD (Sum of Absolute Difference) method, a ZSSD (Zero-mean Sum of Square Difference) method, a ZSAD (Zero mean Sum of Absolute Difference) method, an NCC (Normalized Cross-Correlation) method, or the like.

Referring to FIG. 12 again, at Step S309, the imaging system 10 applies an offset correction to the matching score M(kx, ky) based on the similarity at each position calculated at Step S308 to calculate a corrected final score. At Step S310, the imaging system 10 determines the joint position for the template image of interest based on the corrected score at each position calculated at Step S309.

FIG. 17(A) illustrates a graph of an offset function for the matching score plotted for search positions (kx, ky). At Step S309, an offset value is added to the matching score M(kx, ky) depending on the distance from the temporary position by an offset function (kx, ky) as illustrated in FIG. 17(A). The offset function illustrated in FIG. 17(A) is a function in which the offset value is maximum at the temporary position, and monotonically decreases while the distance to the temporary position gets greater. The offset function may be defined based on the range of possible values of the matching score M. FIGS. 17(B) and (C) illustrate graphs of scores before and after correction plotted with search positions, along with a matching position based on the score before correction and a matching position based on the score after correction. FIG. 17(B) illustrates an example of a template image having a greater characteristic amount whereas FIG. 17(C) illustrates an example of a template image having a smaller characteristic amount.

As illustrated in FIG. 17(B), by the offset correction, the final matching score is raised around the temporary position as the center. However, when the characteristic amount of the template image is great, the similarity greatly fluctuates due to the change of the position, and influence on the matching score by the similarity strongly remains. Therefore, regardless of the offset correction, a position at which the matching score based on the similarity is maximum is generally determined as the matching position. Namely, if the characteristic amount is great enough to be clearly maintained as the peak of the matching score of the similarity, the similarity dominantly determines the joint position.

On the other hand, as illustrated in FIG. 17(C), if the characteristic amount of the template image is small, a usual matching score does not have a clear peak, and the distance from the temporary position has greater influence than the matching score based on the similarity. Therefore, a position in the neighborhood of the temporary position where the offset function takes the maximum value is generally determined as the matching position. Namely, if the characteristic amount is small, the temporary position dominantly determines the joint position.

Once the matching position is determined, the joint position is obtained as a shift amount $(\Delta\theta_i, \Delta\varphi_i)$ from the position where the template image of interest (number i) is superposed at the coordinates of the corrected image for position detection 0 as it is.

Due to the offset correction, if the score based on the similarity has a clear peak, and the similarity is great, the position is set as the joint position. If there are no characteristic and no clear peak, a position in the neighborhood of the temporary position is set as the joint position, with which continuity with the adjacent block is kept, and a risk is reduced in that the joint position is determined at a position far away from the temporary position.

Referring to FIG. 12 again, at Step S311, the imaging system 10 determines whether all blocks of template images have been processed. If it is determined that not all blocks have been processed (NO) at Step S311, the process loops back to Step S306 to complete the process for all blocks. On the other hand, if it is determined that all blocks have been processed (YES) at Step S311, the process goes forward to Step S312.

By the process of Steps S306 to S311, the joint position $(\Delta\theta_i, \Delta\varphi_i)$ is obtained for every one of the generated multiple template images (number where i=1 to #). At Step S312, the imaging system 10 calculates the joint position $(\Delta\theta, \Delta\varphi)$ for each pixel $(\theta, \varphi)$ in the entire celestial sphere format based on the data set of joint positions corresponding to the obtained template images, and generates detection result data 222. At Step S313, the imaging system 10 ends the joint position detection process, and goes back to the process illustrated in FIG. 5.

Figure 19:
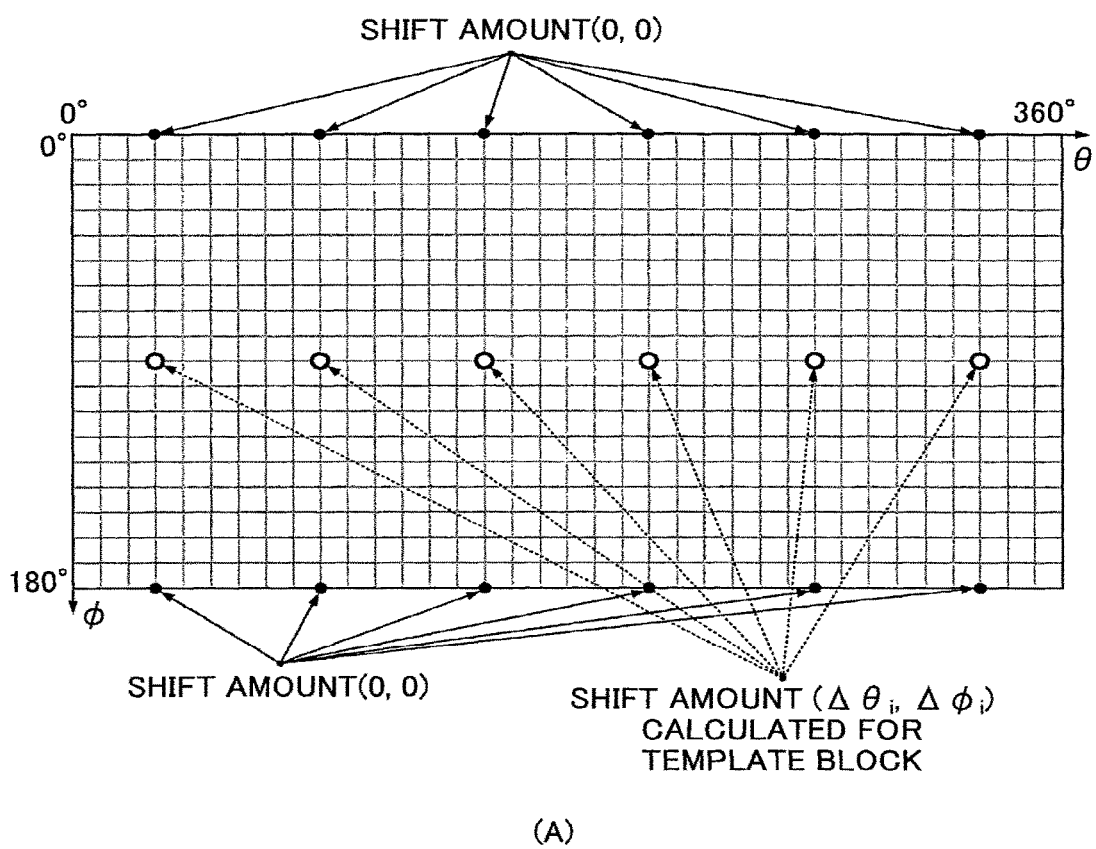
FIG. 19 is a diagram illustrating a process to generate detection result data by a joint position detection unit according to the first embodiment.
Figure 19:
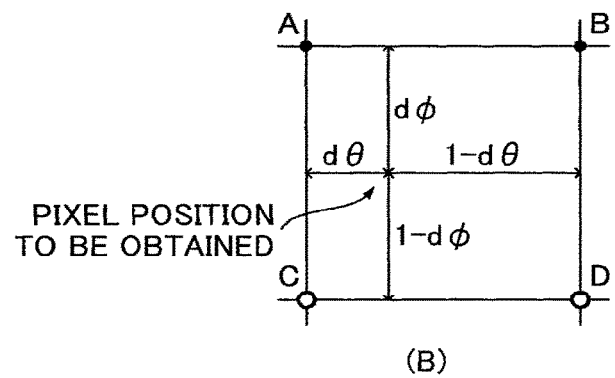

FIG. 18 is a diagram illustrating a data structure of detection result data generated by the joint position detection unit 204 according to the present embodiment. FIG. 19 is a diagram illustrating a process to generate the detection result data by the joint position detection unit 204 according to the present embodiment. By Step S312, the detection result data 222 as illustrated in FIG. is obtained that holds coordinates after conversion $(\theta, \varphi)$ associated with the shift amount $(\Delta\theta, \Delta\varphi)$ for all coordinates. In this case, the shift amount $(\Delta\theta, \Delta\varphi)$ corresponding to coordinates $(\theta, \varphi)$ can be calculated by setting and interpolating the shift amount $(\Delta\theta_i, \Delta\varphi_i)$ of the template block (i) obtained by the joint position detection process as the value of the center coordinates of the template block.

Specifically, first, as illustrated in FIG. 19(A), the shift amount $(\Delta\theta, \Delta\varphi)$ is set to $(0, 0)$ for coordinates whose $\theta$ coordinate in the horizontal direction is equal to the coordinate of the center of the template block, and positioned at the upper end $(\varphi=0)$ and the lower end $(\varphi=1799$ if the height is 1800 pixels). For coordinates to which the shift amounts have not been set, as illustrated in FIG. 19(B), a lattice is formed by four points (denoted A to D in the FIG.) having the shift amounts set, and the shift amount is calculated by two-dimensional linear interpolation in the lattice. Assuming that point Q internally divides the four-point lattice by $d\theta:1-d\theta$ in the $\theta$ axis direction, and $d\varphi:1-d\varphi$ in the $\varphi$ axis direction, the shift amount $(\Delta\theta_Q, \Delta\varphi_Q)$ at point Q can be calculated using the shift amounts of the neighboring four points $((\Delta\theta_A, \Delta\varphi_A), \ldots, (\Delta\theta_D, \Delta\varphi_D))$ by Formula (6) below.

$$\begin{aligned}\Delta\theta_Q &= (1-d\phi)\times((1-d\theta)\times\Delta\theta_A + d\theta\times\Delta\theta_B) + \\ &\quad d\phi\times((1-d\theta)\times\Delta\theta_C + d\theta\times\Delta\theta_D) \\ \Delta\phi_Q &= (1-d\phi)\times((1-d\theta)\times\Delta\phi_A + d\theta\times\Delta\phi_B) + \\ &\quad d\phi\times((1-d\theta)\times\Delta\theta_C + d\theta\times\Delta\theta_D)\end{aligned} \quad (6)$$

Note that, in the present embodiment, the shift amount (0, 0) is set to the upper end (φ=0) and the lower end (φ=1799 in the example) in the entire celestial sphere format. However, the calculation method of the shift amount (Δθ, Δφ) at coordinates (θ, φ) is not specifically limited to the above. It is sufficient here to piece partial images 0 and 1 together without inconsistency. Therefore, other embodiments may execute the two-dimensional linear interpolation by setting the shift amount (0, 0) to coordinates positioned further internally. In this case, all coordinates at the outside of the internal coordinates in the φ direction may be set to have the shift amount (0, 0).

Referring to FIG. 5 again, at Step S203, the imaging system 10 has the table correction unit 206 correct the conversion table for position detection 220 using the detection result data 222 to adjust the position of an image in the spherical surface coordinates system. As illustrated in FIG. 18, the shift amount is obtained for every pair of coordinates in the entire celestial sphere image format by the joint position detection process at Step S202. At Step S203, specifically, the distortion correction table for detection 0 used for distortion correction of the partial image 0 is corrected so that input coordinates (θ, φ) are associated with (x, y), which has been associated with (θ+Δθ, φ+Δφ) before correction. Note that distortion correction table for detection 1 used for distortion correction of the partial image 1 does not need to be changed for the association.

At Step S204, the imaging system 10 has the table generation unit 208 generate a conversion table for image synthesis 224 from the corrected conversion table for position detection 220 by applying rotational coordinate transformation to it.

Figure 20:
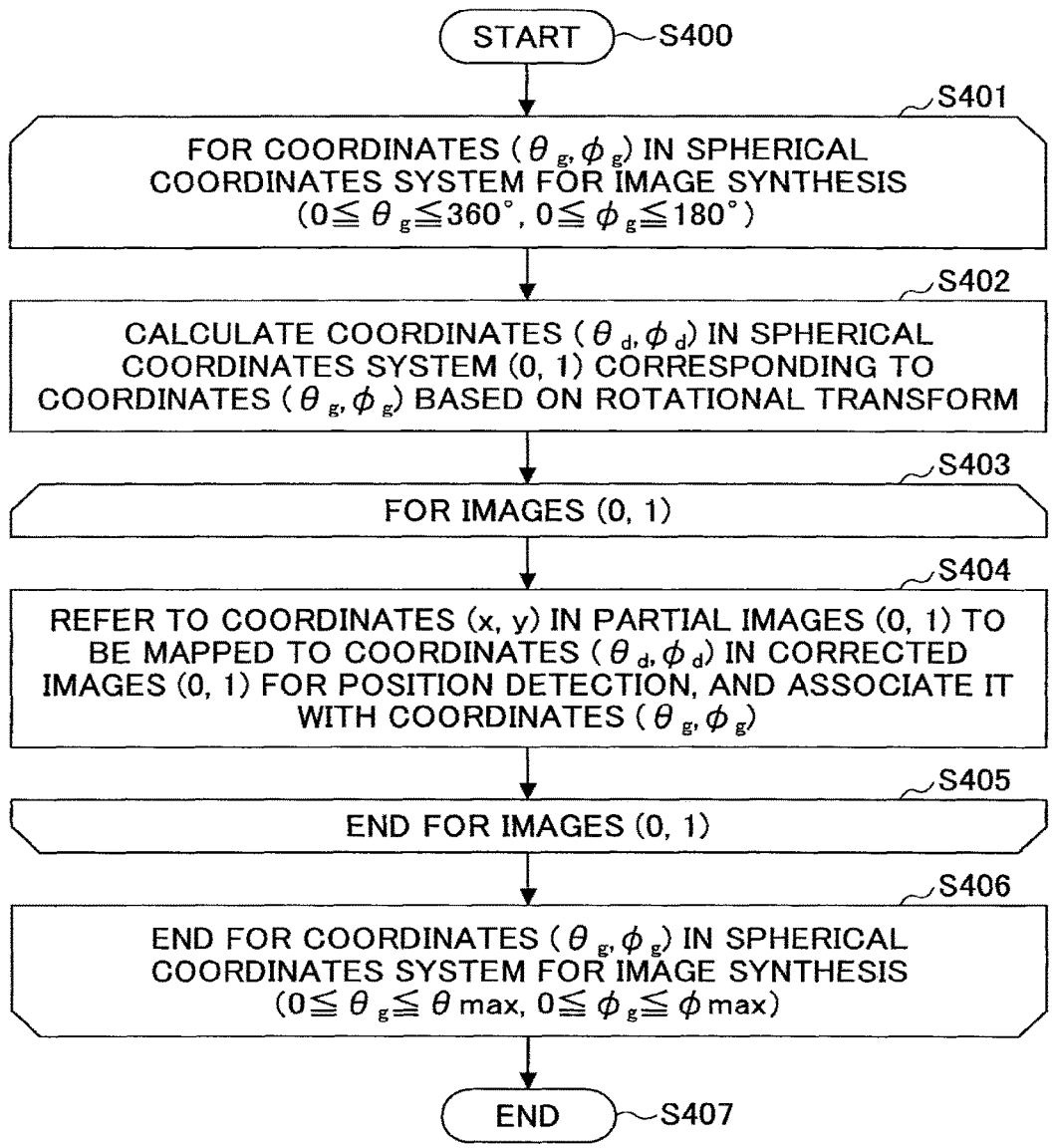
FIG. 20 is a flowchart of a generation process of a conversion table for image synthesis executed by the entire celestial sphere imaging system according to the first embodiment.
Figure 21:
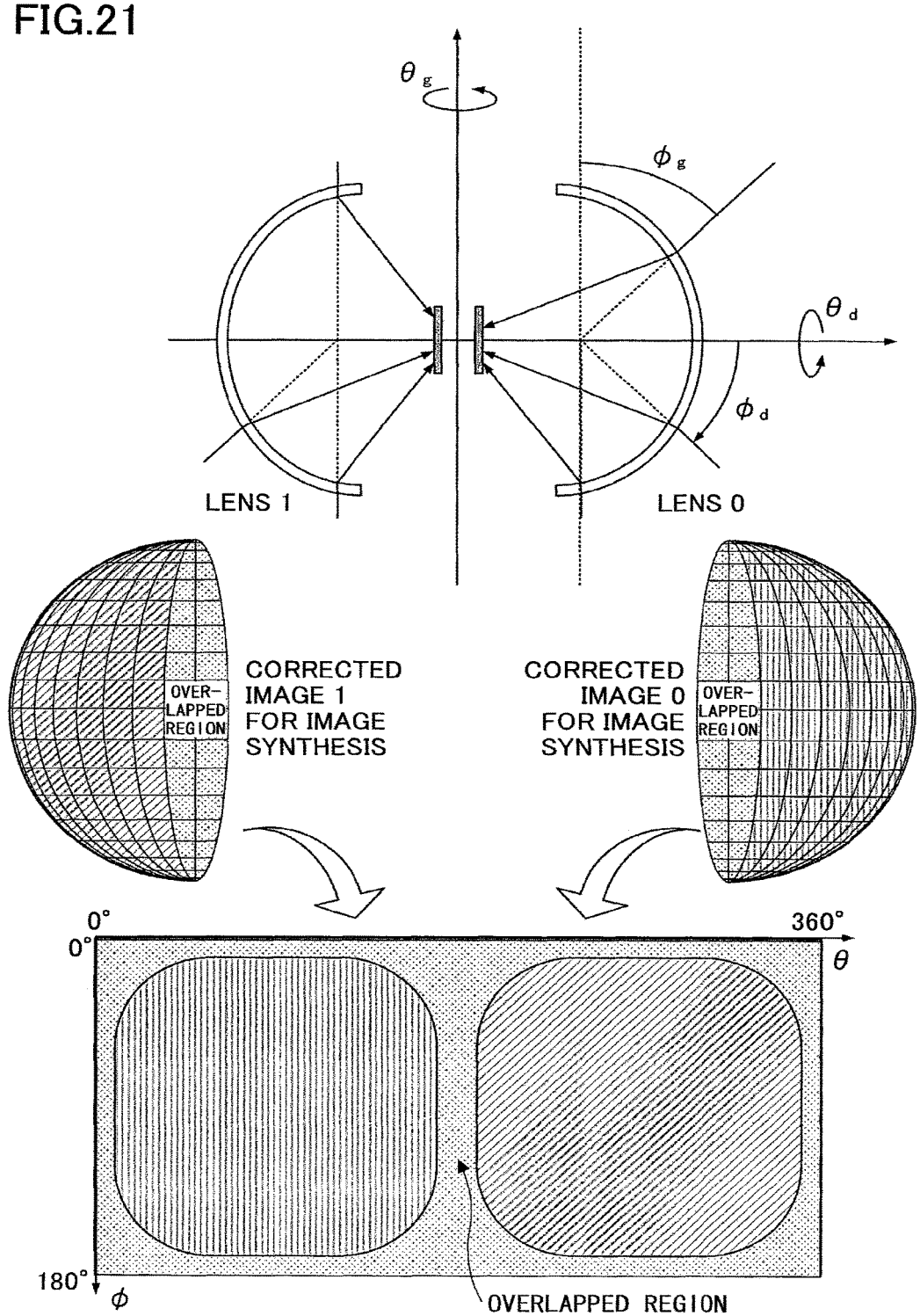
FIG. 21 is a diagram illustrating a mapping of two partial images onto a spherical coordinate system where the images are captured by two fisheye lenses during an image synthesis process.

FIG. 20 is a flowchart of a generation process of a conversion table for image synthesis executed by the imaging system 10 according to the present embodiment. FIG. 21 is a diagram illustrating a mapping of two partial images onto a spherical coordinate system where the images are captured by two fisheye lenses during an image synthesis process. The process illustrated in FIG. 20 is called at Step S204 illustrated in FIG. 5, and starts at Step S400. In a loop of Steps S401 to S406, the table generation unit 208 executes a process of Steps S402 to S405 for each pair of coordinates ($\theta_g$, $\varphi_g$) in the spherical coordinate system for image synthesis, which is input into the distortion correction table for image synthesis. The ranges of coordinates to be set are defined by the entire range of horizontal angles (0 to 360°) and the entire range of vertical angles (0 to 180°). To execute the conversion process for all coordinates to be input, coordinates are arranged in order here.

At Step S402, the table generation unit 208 calculates coordinates ($\theta_d$, $\varphi_d$) in the spherical coordinates system corresponding to coordinates ($\theta_g$, $\varphi_g$) by rotational transform. By the rotational coordinate transformation, axes are changed from those defined by the horizontal angle $\theta_d$ around the optical axis of one of the lens optical systems, and the coordinates axis of the vertical angle $\varphi_d$ as illustrated in FIG. 9, into axes defined by the horizontal angle $\theta_g$ having the axis perpendicular to the optical axis as a reference and the vertical angle $\varphi_g$ as illustrated in FIG. 21. The coordinates ($\theta_d$, $\varphi_d$) corresponding to the coordinates ($\theta_g$, $\varphi_g$) can be calculated based on the rotational coordinate transformation by Formula (7) below, using the radius vector of 1, three-dimensional Cartesian coordinates ($x_g$, $y_g$, $z_g$) corresponding to coordinates ($\theta_g$, $\varphi_g$) in the spherical coordinate system for image synthesis, and three-dimensional Cartesian coordinates ($x_d$, $y_d$, $z_d$) corresponding to coordinates ($\theta_d$, $\varphi_d$) in the spherical coordinate system for position detection.

Note that, in Formula (7), a coefficient β is a rotation angle that specifies the rotational coordinate transformation around the x-axis in the three-dimensional Cartesian coordinates, which is 90° in the present embodiment.

$$\left.\begin{array}{l} x_g = \sin(\phi_g)\cos(\theta_g) \\ y_g = \sin(\phi_g)\sin(\theta_g) \\ z_g = \cos(\phi_g) \\ \begin{pmatrix} x_d \\ y_d \\ z_d \end{pmatrix} = \begin{pmatrix} 1 & 0 & 0 \\ 0 & \cos\beta & \sin\beta \\ 0 & -\sin\beta & \cos\beta \end{pmatrix} \begin{pmatrix} x_g \\ y_g \\ z_g \end{pmatrix} \\ \phi_d = \text{Arccos}(z_d) \\ \theta_d = \text{Arctan}\left(\frac{y_d}{x_d}\right) \end{array}\right\} \quad (7)$$

In the conversion table for position detection 220, the optical axis is projected onto a pole of the spherical surface, and the overlapped part between images is projected onto the neighborhood of the equator of the spherical surface. Therefore, the top-bottom direction in the entire celestial sphere image format is not coincident with the zenith direction of a captured scene. In contrast to this, by the rotational coordinate transformation, in the conversion table for image synthesis 224, the optical axis is projected onto the equator of the spherical surface, and hence, the top-bottom direction in the entire celestial sphere image format is coincident with the zenith direction of the captured scene.

In the loop of Steps S403 to S405, the table generation unit 208 executes Step S404 for the image 0 and the image 1, respectively. At Step S404, the table generation unit 208 obtains, for the images 0 and 1, coordinates (x, y) of the partial image (0, 1) that can be associated with ($\theta_d$, $\varphi_d$) with reference to the corrected conversion table for joint position detection. Note that the conversion tables 220 and 224 hold coordinates (x, y) for both $\theta_d$ and $\varphi_d$ by units of pixels although coordinates ($\theta_d$, $\varphi_d$) calculated by conversion are typically obtained with floating-point values. Simply, coordinates (x, y) in the partial image (0, 1) may be set to coordinates (x, y) associated with coordinates existing in the closest neighborhood of the calculated coordinates ($\theta_d$, $\varphi_d$) in the table. Also, in a favorable embodiment, coordinates (x, y) of the partial image (0, 1) to be associated may be calculated by executing weighted interpolation depending on the distance from calculated coordinates ($\theta_d$, $\varphi_d$) with reference to multiple coordinates (x, y) that are associated with the closest coordinates and the surrounding coordinates among those existing in the table.

When calculation has been done for both images (0, 1) in the loop of Steps S403 to S405, and calculation has been completed for all coordinates values to be input in the loop of Steps S402 to S406, the process ends at Step S407. Thus, all data are generated in the conversion table for image synthesis 224.

Referring to FIG. 5 again, at Step S205, the imaging system 10 has the distortion correction unit for image synthesis 210 execute distortion correction for the original partial image 0 and partial image 1 using the conversion table for image synthesis 224 to obtain the corrected image for image synthesis 0 and the corrected image for image synthesis 1. Thus, as a result of the process by the distortion correction unit for image synthesis 210, two partial images 0-1 captured by the fisheye lenses are expanded on the entire celestial sphere image format as illustrated in FIG. 21. The partial image 0 captured by the fisheye lens 0 is typically mapped on the left hemisphere in the entire celestial sphere, and the partial image 1 captured by the fisheye lens 1 is typically mapped on the right hemisphere in the entire celestial sphere fisheye lens 1.

It can be clearly understood by comparing FIG. 9 and FIG. 21 that the partial image 0 and partial image 1 are mapped at different positions in the entire celestial sphere format, and the zenith direction of the scene is coincident with the φ direction, which is the top-bottom direction of the image. The center parts of the partial images 0 and 1 are mapped onto the equator having less distortion, and the overlapped region between the corrected image 0 and the corrected image 1 is mapped, differently from that illustrated in FIG. 9, onto the neighboring regions at the vertical angles of 0° and 180°, and the horizontal angles of 0° and 180°.

At Step S206, the image synthesis unit 212 synthesizes the corrected image for image synthesis 0 and the corrected image for image synthesis 1. In the synthesis process, a blend process or the like is executed for the overlapped region between images. For a region where pixel values exist only in one of the images, those pixel values are adopted as they are. By the synthesis process, a single entire celestial sphere image is generated from two partial images captured by fisheye lenses.

As described above, in the present embodiment, the characteristic amount is measured that indicates a degree of characteristic held by a template image to be processed for matching, and using the measured characteristic amount, joint positions of the template images are determined. Thus, regions having greater characteristic amounts are prioritized to be pieced together to improve the quality of an entire celestial sphere image to be obtained. Namely, regions having greater characteristic amounts are prioritized to be pieced together, and their joint positions are referred to when regions having smaller characteristic amounts are pieced together. Thus, even if an image is flat, or it is a region where the same pattern is repeated with few characteristics, it is possible to detect a joint position with high precision, which improves the quality of the entire celestial sphere image to be obtained. Also, if multiple candidates of joint positions exist just by using the similarity for a case where the same pattern is repeated, by referring to joint positions of adjacent characteristic regions, the joint position can be uniquely determined.

Moreover, the algorithm can be simplified because a calculation process is not adopted that excludes an inappropriate matching region having a smaller characteristic amount. Also, the entire celestial sphere imaging system 10 deals with the omniazimuth imaging range. Therefore, it is often the case that the overlapped region includes scenes that are flat and not suitable for piecing together such as the sky. The piecing-together process of multiple images according to the present embodiment can be favorably used for piecing together the entire celestial sphere image having such properties.

[Second Embodiment]

A second embodiment of the present invention will be described below, focusing on parts that are different from the previous embodiment.

The second embodiment has a matching calculation unit 242 that is different from the one included in the configuration illustrated in FIG. 10 for the previous embodiment. For the template image of interest, the matching calculation unit 242 typically calculates matching between the template image of interest and parts in the corrected image for position detection based on the calculated temporary position by typically using a template matching method. When calculating the matching, a template image is moved in the search range centered around the temporary position set by the search range setting unit 240, and a matching score is calculated that is an evaluation value based on similarity of the images at positions. Further in the present embodiment, multiple evaluation methods are provided for ranges of the characteristic amount of the template image. Then, the matching calculation unit 242 in the present embodiment calculates the matching score by switching the matching evaluation methods depending on the characteristic amount calculated by the template characteristic amount calculation unit 234.

For the template image of interest, the score correction unit 244 executes an offset correction for the score based on the similarity of the images calculated by the matching calculation unit 242, to make the score higher around the calculated temporary position. Note that the range of scores may differ depending on the used evaluation method. Therefore, the score correction unit 244 switches the offset correction method depending on the evaluation method used by the matching calculation unit 242. In this way, the temporary position calculated based on the relative relationship of the characteristic amounts between the template images is taken into account when calculating the score, and correction of the score can be done that is appropriate for the matching evaluation method.

Figure 24:
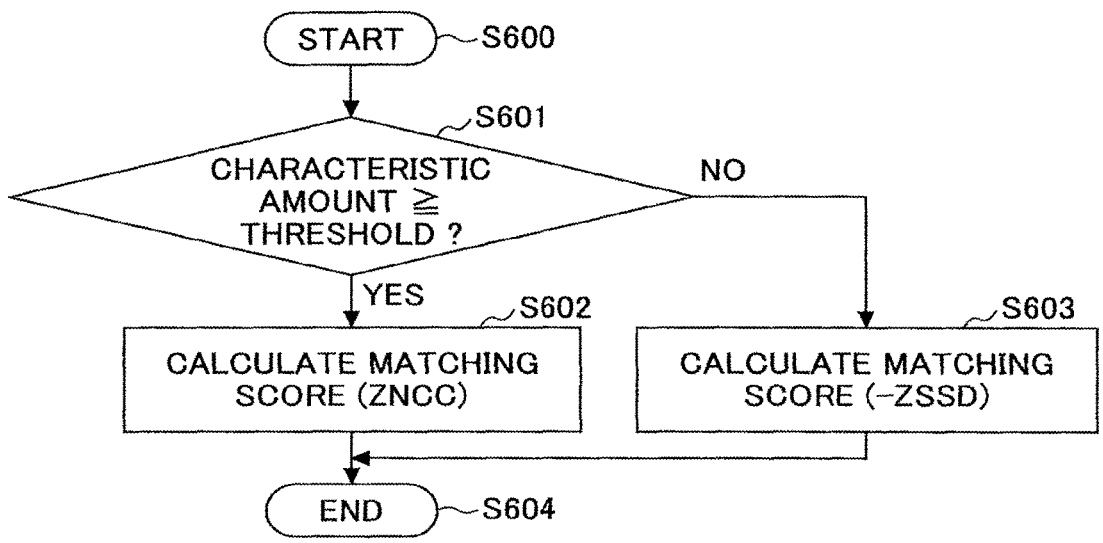
FIG. 24 includes diagrams illustrating (A) a matching calculation process; and (B) a score correction process executed by the entire celestial sphere imaging system according to the first embodiment.
Figure 24:
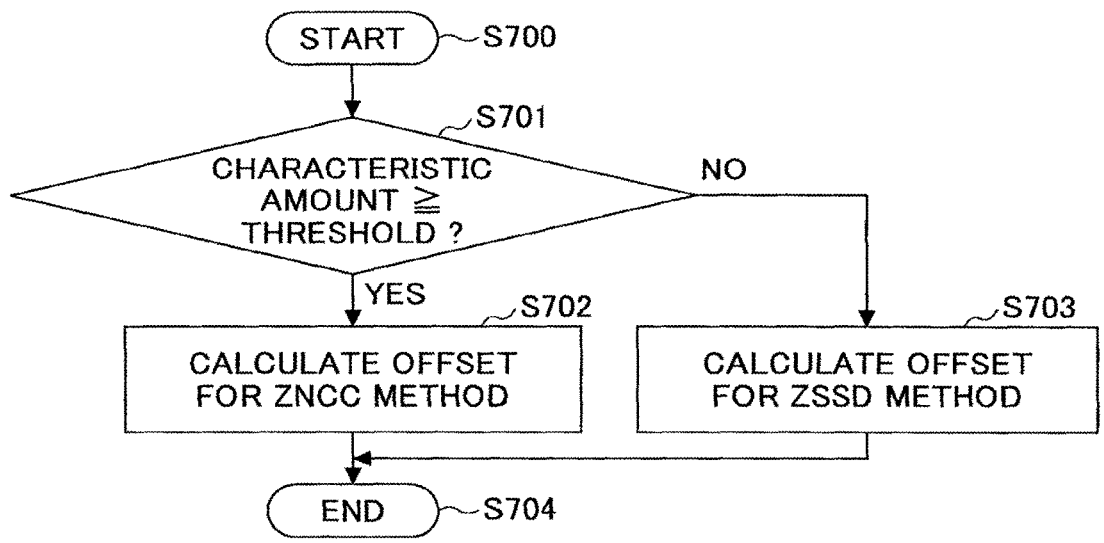

Next, the matching calculation process will be described in detail according to the present embodiment using FIG. 24. FIG. 24(A) is a flowchart illustrating details of the matching calculation process executed by the imaging system 10 according to the present embodiment. The process illustrated in FIG. 24(A) is called at Step S308 illustrated in FIG. 12, and starts at Step S600. At Step S601, the imaging system 10 determines whether the characteristic amount of the template image of interest is greater than or equal to a predetermined threshold value. Also, in the present embodiment, the predetermined threshold value is defined to segment the characteristic amount according to whether it is greater or less than the threshold value. If the characteristic amount of the template image of interest is determined to be greater than or equal to the predetermined threshold value (YES) at Step S601, the process branches to Step S602.

At Step S602, the imaging system 10 calculates the matching score by an evaluation method suitable for an image having a great characteristic amount. The process ends at Step S604, and the process illustrated in FIG. 12 is resumed. On the other hand, if the characteristic amount of the template image of interest is determined not to be greater than or equal to the predetermined threshold value (NO) at Step S601, the process branches to Step S603. At Step S603, the imaging system 10 calculates the matching score by an evaluation method suitable for an image having a small characteristic amount. The process ends at Step S604, and the process illustrated in FIG. 12 is resumed.

In the following, a Zero-mean Normalized Cross-Correlation (ZNCC) method and a Zero-mean Sum of Squared Differences (ZSSD) method are described as examples of template matching with reference to FIG. 16 shown above. FIG. 16 includes diagrams illustrating (A) a template image; and (B) a process of searching for a template image in a search range by pattern matching. Here, N represents the total number of pixels in a template (=W pixels×H pixels), and (kx, ky) represents a search position in the search range. Denoting the brightness at coordinates (i, j) in the template image by $T(i, j)$, and the brightness in a search image by $S(kx+i, ky+j)$ when the search position (kx, ky) is set to the reference by the e coordinates (0, 0), matching score M(kx, ky) by the ZNCC method can be obtained by Formula (8) below. Note that although the search position (kx, ky) is set at the upper left of the template image in FIG. 16, the coordinates are not specifically limited, but may be set at the center of the template image.

$$ZNCC(kx, ky) = \frac{N\sum_{j=0}^{h-1}\sum_{i=0}^{w-1} S(kx+i, ky+j)T(i,j) - \sum_{j=0}^{h-1}\sum_{i=0}^{w-1} S(kx+i, ky+j) \times \sum_{j=0}^{h-1}\sum_{i=0}^{w-1} T(i,j)}{\sqrt{\left(N\sum_{j=0}^{h-1}\sum_{i=0}^{w-1}\{S(kx+i, ky+j)\}^2 - \left\{\sum_{j=0}^{h-1}\sum_{i=0}^{w-1} S(kx+i, ky+j)\right\}^2\right) \times \left(N\sum_{j=0}^{h-1}\sum_{i=0}^{w-1}\{T(i,j)\}^2 - \left\{\sum_{j=0}^{h-1}\sum_{i=0}^{w-1} T(i,j)\right\}^2\right)}} \tag{8}$$

The matching score ZNCC(kx, ky) represents the similarity. If it is 1, it is complete matching, or if the score is −1, it is a negative-positive reversal. A higher matching score ZNCC(kx, ky) indicates higher similarity with the template image. As illustrated in FIG. 16(B), template matching is executed by shifting the template image vertically and horizontally within the search range, and the matching score ZNCC(kx, ky) is calculated at each search position.

In contrast to this, a difference ZSSD(kx, ky) by the ZSSD method can be obtained by Formula (9) below. Note that the ZSSD method obtains the sum of squares of differences of brightness of the pixels at the same position. Therefore, a value obtained by the ZSSD method represents a difference, and a greater value means less similarity. Therefore, to make it a score based on the similarity, the negative sign is attached to use −ZSSD(kx, ky) as the matching score.

$$ZSSD(kx, ky) = \frac{\sum_{j=0}^{h-1}\sum_{i=0}^{w-1}\{S(kx+i, ky+j)\}^2}{N} - \frac{\left\{\sum_{j=0}^{h-1}\sum_{i=0}^{w-1} S(kx+i, ky+j)\right\}^2}{N^2} + \frac{\sum_{j=0}^{h-1}\sum_{i=0}^{w-1}\{T(i,j)\}^2}{N} - \frac{\left\{\sum_{j=0}^{h-1}\sum_{i=0}^{w-1} T(i,j)\right\}^2}{N^2} - 2\left[\frac{\sum_{j=0}^{h-1}\sum_{i=0}^{w-1} S(kx+i, ky+j)T(i,j)}{N} - \frac{\sum_{j=0}^{h-1}\sum_{i=0}^{w-1} S(kx+i, ky+j) \cdot \sum_{j=0}^{h-1}\sum_{i=0}^{w-1} T(i,j)}{N^2}\right] \tag{9}$$

Assuming a pixel value is an 8-bit value, the matching score −ZSSD(kx, ky) can take values in the range of −(255×255) to 0, and if it is 0, it is complete matching. A higher matching score −ZSSD(kx, ky) indicates higher similarity with the template image.

The ZNCC method described above can absorb fluctuation of gain of an image, can absorb fluctuation of average brightness of an image, and it has robustness for matching the similarity, which makes the ZNCC method favorable. The ZNCC method can be used especially when brightness of an image has sufficiently wide distributions and the characteristic amount is great. In contrast to this, the ZSSD method is better than the SSD (Sum of Squared Differences) method in that the ZSSD method can absorb fluctuation of average brightness of an image. The ZSSD has a greater calculation cost than the SSD method, but the calculation is simpler than that of the ZNCC method. The ZSSD method can be favorably used especially for a fuzzy image having a small characteristic amount. Note that a Zero-mean Sum of Absolute Differences (ZSAD) method may be used instead of the ZSSD method.

Referring to FIG. 12 again, at Step S309, the imaging system 10 applies an offset correction to the matching score ZNCC(kx, ky) or −ZSSD(kx, ky) based on the similarity at each calculated position at Step S308 to calculate a corrected final score.

FIG. 24(B) is a flowchart illustrating details of the score correction process executed by the imaging system 10 according to the present embodiment. The process illustrated in FIG. 24(B) is called at Step S309 illustrated in FIG. 12, and starts at Step S700. At Step S701, the imaging system 10 determines whether the characteristic amount of the template image of interest is greater than or equal to a predetermined threshold value. If the characteristic amount of the template image of interest is determined to be greater than or equal to the predetermined threshold value (YES) at Step S701, the process branches to Step S702. In this case, the ZNCC method is used for calculating the score. Therefore, the imaging system 10 uses an offset function for the ZNCC method to calculate the offset at Step S702. The process ends at Step S704, and the process illustrated in FIG. 12 is resumed.

On the other hand, if the characteristic amount of the template image of interest is determined not to be greater than or equal to the predetermined threshold value (NO) at Step S701 (NO) the process branches to Step S703. In this case, the ZSSD method is used for calculating the score. Therefore, the imaging system 10 uses an offset function for the ZSSD method to calculate the offset at Step S703. The process ends at Step S704, and the process illustrated in FIG. 12 is resumed.

At Step S310, the imaging system 10 determines the joint position for the template image of interest based on the corrected score at each calculated position at Step S309.

FIG. 17(A) illustrates a graph of an offset function for the matching score plotted for search positions (kx, ky). At Step S309, an offset value is added to the matching score M(kx, ky) depending on the distance from the temporary position by an offset function (kx, ky) as illustrated in FIG. 17(A). The offset function illustrated in FIG. 17(A) is a function in which the offset value is maximum at the temporary position, and monotonically decreases while the distance to the temporary position gets greater. The offset function may be defined based on the range of possible values of the matching score M. FIGS. 17(B) and (C) illustrate graphs of scores before and after corrections are plotted with search positions, along with a matching position based on the score before correction and a matching position based on the score after correction. FIG. 17(B) illustrates an example of a template image having a greater characteristic amount whereas FIG. 17(C) illustrates an example of a template image having a smaller characteristic amount.

As described above, in the present embodiment, the characteristic amount is measured that indicates a degree of characteristic held by a template image to be processed for matching, and using the measured characteristic amount, joint positions of the template images are determined. Thus, regions are pieced together by an appropriate evaluation method to improve the quality of an entire celestial sphere image to be obtained. More specifically, the evaluation method for obtaining a matching score is switched depending on the characteristic of a region. Thus, joint positions can be determined based on the evaluation methods appropriate for regions having greater characteristic amounts and regions having smaller characteristic amounts, respectively. Therefore, errors in joint position detection can be reduced, and the precision of position matching can be improved. In addition, even if an image is flat, or it is a region where the same pattern is repeated with few characteristics, it is possible to detect a joint position with high precision, which improves the quality of the entire celestial sphere image to be obtained. Moreover, the algorithm can be simplified because a calculation process is not adopted that excludes an inappropriate matching region having a smaller characteristic amount.

Comparing the ZNCC method with the ZSSD method, the ZNCC method has higher precision in general. However, in the embodiment described above, it is controlled to use the ZNCC method basically while the ZSSD method is used for an image having a weak characteristic region, especially for a flat image. Advantages to use of the ZSSD method for a weak characteristic image instead of the ZNCC method will be described below.

For example, assume that matching evaluation is executed for a flat image such as the blue sky or a white wall. Such a flat image typically includes noise mixed when the image was captured. When executing matching evaluation between flat images having noise, compared to the ZNCC method that gives a kind of a so-called "correlation value", the ZSSD method that gives an error difference value as the sum of error differences of pixels calculates a moderate error difference between noisy images, which is a favorable value as the matching evaluation value. In the embodiment described above, desiring to get a favorable value as the matching evaluation value as a matching evaluation value for a flat image, the ZSSD method that gives the error difference value is used for a template image having a small characteristic amount, instead of the ZNCC method that gives the correlation value.

The entire celestial sphere imaging system 10 deals with the omniazimuth imaging range. Therefore, it is highly likely that the overlapped region includes scenes that are flat and not suitable for piecing together such as the sky. The piecing-together process of multiple images according to the present embodiment can be favorably used for piecing together the entire celestial sphere image having such properties.

[Third Embodiment]

In the embodiments described above, examples of an image processing apparatus and an imaging system are described using the imaging system 10 that captures still pictures of an entire celestial sphere by imaging optical systems provided in it, and synthesizes a final image by a distortion correction/image synthesis block in its inside. However, the configuration of the image processing apparatus and the imaging system is not specifically limited to the above. It may be configured as an entire celestial sphere moving picture imaging system to capture moving pictures of the entire celestial sphere, or as a camera processor to generate an entire celestial sphere image (still picture or moving picture) when receiving multiple partial images (still picture or moving picture) captured by multiple imaging optical systems as input. Alternatively, an information processing apparatus such as a personal computer, a workstation, or a virtual machine on a physical computer system, or a portable information terminal such as a smart phone or a tablet, may be configured as the above image processing apparatus that receives as input multiple partial images (still picture or moving picture) captured by an entire celestial sphere imaging device used only for imaging, to synthesize an entire celestial sphere image (still picture or moving picture). Also, an imaging system may be configured that includes an image processing apparatus such as the camera processor, the information processing apparatus, or the portable information terminal as described above, and an imaging optical system separated from the image processing apparatus.

Figure 22:
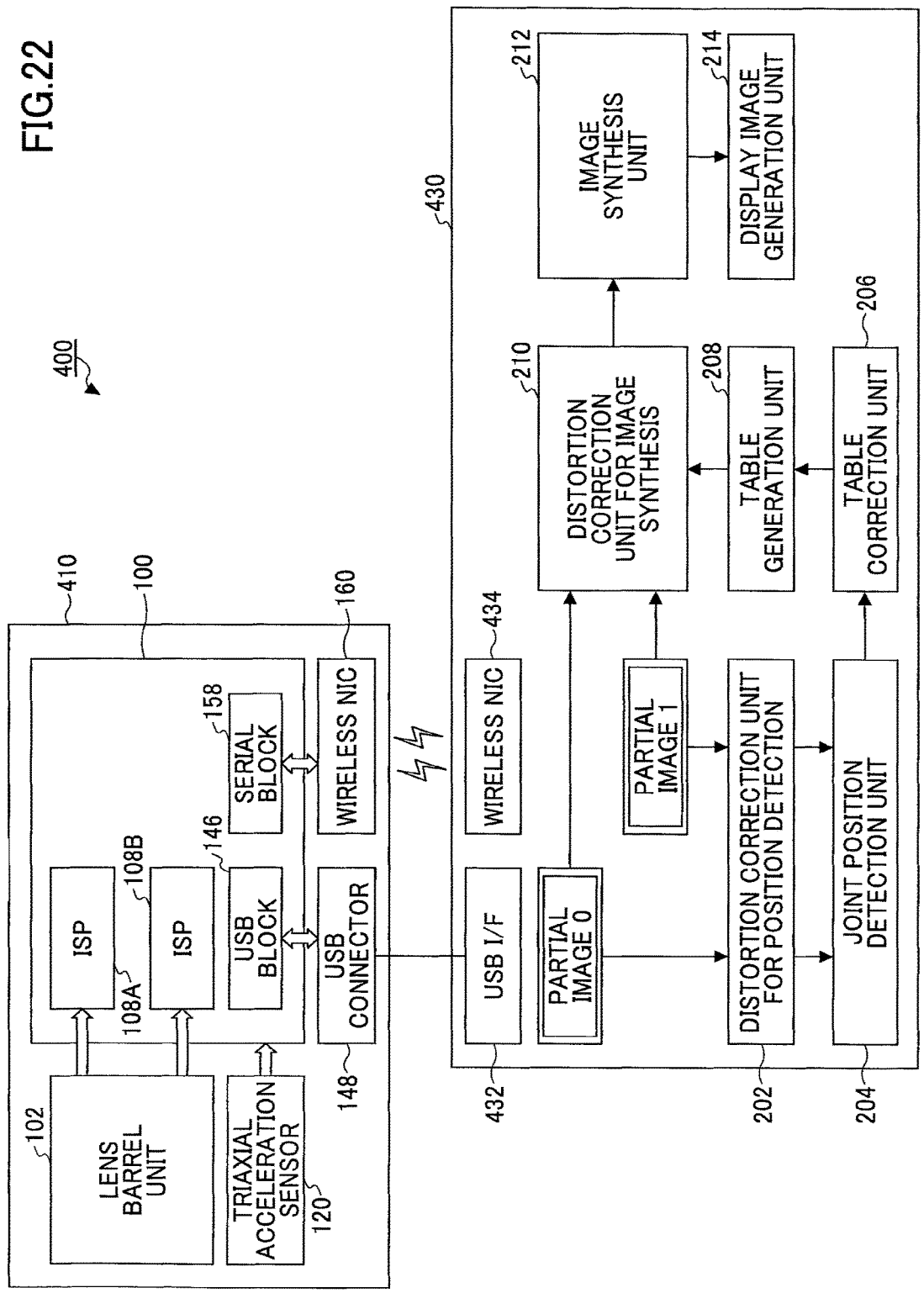
FIG. 22 is an overall view of the entire celestial sphere imaging system according to a second embodiment.

In the following, a third embodiment will be described with reference to FIGS. 22-23 where an entire celestial sphere imaging system includes an entire celestial sphere imaging device that captures multiple partial images, and an external computer device to generate a synthesized entire celestial sphere image when receiving the multiple partial images as input. FIG. 22 is an overall view of the entire celestial sphere imaging system 400 according to the present embodiment.

The entire celestial sphere imaging system 400 illustrated in FIG. 22 according to the third embodiment is constituted with an entire celestial sphere imaging device 410 used only for imaging, and a computer device 430 connected with the entire celestial sphere imaging device 410 and used only for image processing. Note that only main elements are illustrated in FIG. 22, and details are omitted. Also, the elements having the same functions as those described with reference to FIG. 1 to FIG. 21 are assigned the same numerical codes. Also, the entire celestial sphere imaging system 400 in the example illustrated in FIGS. 22-23 has substantially the same configuration as the embodiments described with reference to FIGS. 1-21 except that image processing to synthesize an entire celestial sphere image is solely executed on the computer device 430. Therefore, different points will be mainly described in the following.

In the example illustrated in FIG. 22, the entire celestial sphere imaging device 410 includes a digital still camera processor 100, a lens barrel unit 102, and a triaxial acceleration sensor 120 connected with the processor 100. The lens barrel unit 102 has the same configuration as that illustrated in FIG. 2, and the processor 100 has the same configuration as that illustrated in FIG. 2.

The processor 100 includes ISPs 108, a USB block 146, a serial block 158, and controls USB communication with the computer device 430 connected via a USB connector 148. The serial block 158 is connected with a wireless NIC 160 to control wireless communication with the computer device 430 connected via a network.

The computer device 430 illustrated in FIG. 22 may be constituted with a general-purpose computer such as a desktop personal computer or a workstation. The computer device 430 includes hardware components such as a processor, a memory, a ROM, and a storage. In the example illustrated in FIG. 22, the computer device 430 includes a USB interface 432 and a wireless NIC 434, and is connected with the entire celestial sphere imaging device 410 via a USB bus or a network.

The computer device 430 is configured to further include a distortion correction unit for position detection 202, a joint position detection unit 204, a table correction unit 206, a table generation unit 208, a distortion correction unit for image synthesis 210, and an image synthesis unit 212, which are process blocks related to image synthesis. In the present embodiment, two partial images captured by multiple imaging optical systems of the lens barrel unit 102, and a conversion table for position detection of the entire celestial sphere imaging device 410 are transferred to the external computer device 430 via the USB bus or the network.

In the computer device 430, the distortion correction unit for position detection 202 applies distortion correction to partial images 0 and 1 transferred from the entire celestial sphere imaging device 410 using the conversion table for position detection transferred along with the images, to generate the corrected images for position detection 0 and 1. The joint position detection unit 204 detects joint positions between the converted corrected images 0 and 1 to generate detection result data. The table correction unit 206 corrects the transferred conversion table for position detection based on the detection result data. The table generation unit 208 generates a conversion table for image synthesis by applying rotational coordinate transformation to the corrected conversion data.

As a preprocess of an image synthesis process, the distortion correction unit for image synthesis 210 applies a distortion correction to the original partial image 0 and partial image 1 using the conversion table for image synthesis, and generates the corrected images for image synthesis 0 and 1. The image synthesis unit 212 synthesizes the obtained corrected image for images synthesis 0 and 1, and generates a synthesized image in the entire celestial sphere image format.

The functional block 430 illustrated in FIG. 4 may further include a display image generation unit 214. The display image generation unit 214 executes image processing to project an entire celestial sphere image on a flat display device. The computer device 430 according to the present embodiment implements the functional units described above and processes described later under the control of the CPU, by reading a program from the ROM or HDD to load it in a work space provided by the RAM.

Figure 23:
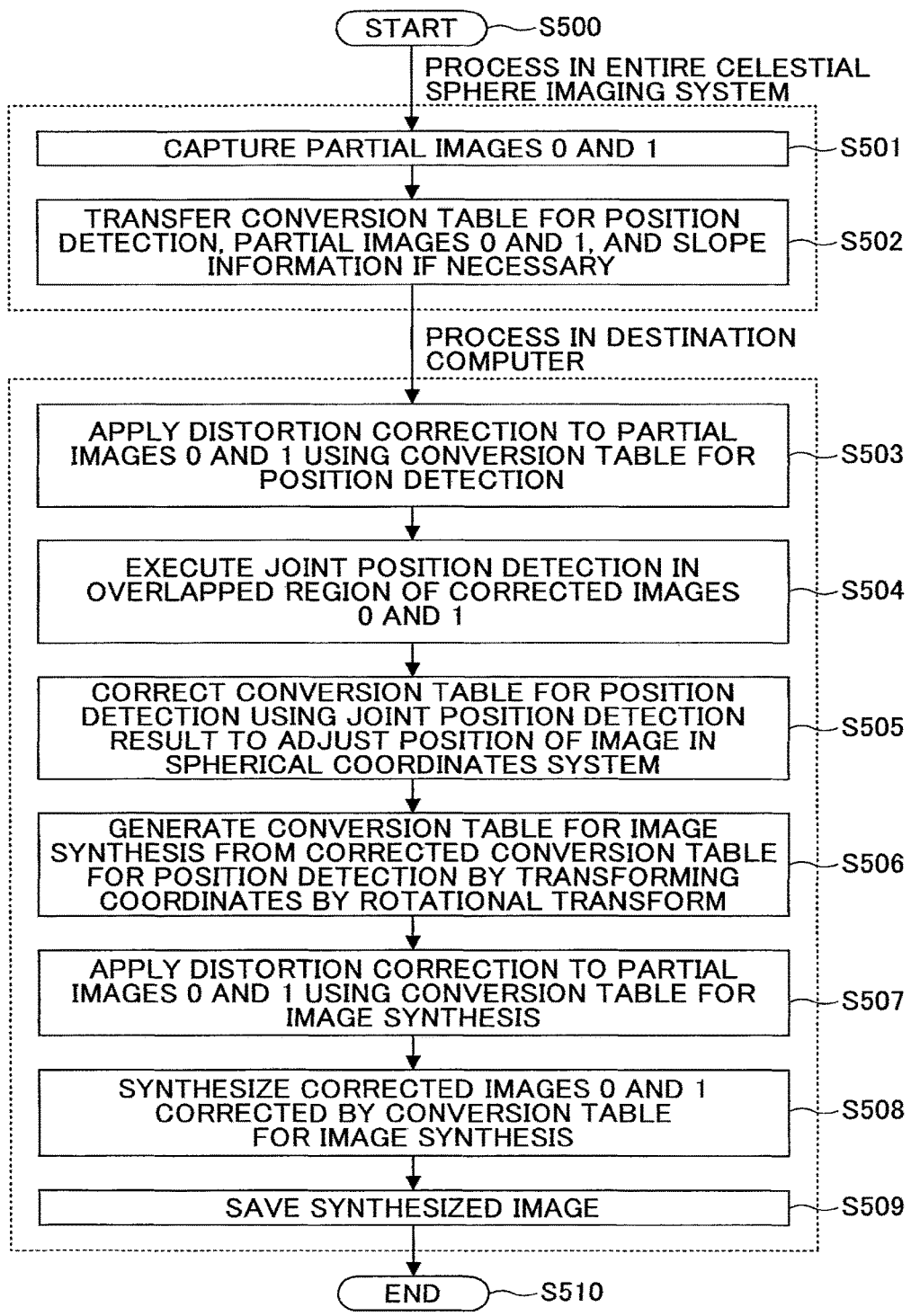
FIG. 23 is a flowchart of an entire celestial sphere image synthesis process as a whole executed by the entire celestial sphere imaging system according to the second embodiment.

FIG. 23 is a flowchart of an entire celestial sphere image synthesis process as a whole executed by the entire celestial sphere image imaging system 400 according to the present embodiment. FIG. 23 illustrates the flow after the entire celestial sphere imaging device 410 takes captured images as input until the images are stored in the computer device 430.

The process illustrated in FIG. 23 starts at Step S500, for example, in response to a pressing of the shutter button of the entire celestial sphere imaging device 410, which is a command to have the two imaging optical systems execute imaging. First, the process in the entire celestial sphere imaging device 410 is executed.

At Step S501, the entire celestial sphere imaging device 410 captures a partial image 0 and a partial image 1 by the two solid-state image sensing devices 22A-22B. At Step S502, the entire celestial sphere imaging device 410 transfers the partial image 0 and partial image 1 to the computer device 430 via the USB bus or the network. The conversion table for position detection is also transferred to the computer device 430 via the USB bus or the network. At this moment, if a slope correction is executed by the computer device 430, slope information obtained by the triaxial acceleration sensor 120 is also transferred to the computer device 430.

Note that the conversion table for position detection of the entire celestial sphere imaging device 410 may be transferred when the entire celestial sphere imaging device 410 and the computer device 430 first recognize each other. Namely, it is sufficient to transfer the conversion table for position detection to the computer device 430 once; the conversion table does not need to be transferred every time. The conversion table for position detection is stored in, for example, an SDRAM (not illustrated) to be read out and transferred. The steps so far are executed in the process on the entire celestial sphere imaging device 410. Steps S503 and after are executed in the process on the computer device 430 where the images and table have been transferred.

At Step S503, the computer device 430 has the distortion correction unit for position detection 202 apply distortion correction to the transferred partial images 0 and 1 using the conversion table for position detection to obtain corrected images for position detection 0 and 1. At this moment, if a slope correction is executed by the computer device 430 based on the transferred slope information, a correction may be applied in advance to the conversion table for position detection in the vertical direction. At Step S504, the computer device 430 has the joint position detection unit 204 execute joint position detection in the overlapped region of the corrected images 0 and 1 to obtain detection result data. At Step S505, the computer device 430 has the table correction unit 206 correct the transferred conversion table for position detection using the joint position detection result to adjust the position of the images in the spherical coordinates system. At Step S506, the computer device 430 has the table generation unit 208 generate a conversion table for image synthesis from the corrected conversion table for position detection by transforming coordinates by rotational transform.

At Step S507, the computer device 430 has the distortion correction unit for image synthesis 210 apply distortion correction to the original partial images 0 and 1 using the conversion table for image synthesis to obtain corrected images for image synthesis 0 and 1. By the above synthesis process, an entire celestial sphere image is generated from the two partial images captured by the fisheye lenses. Then, at Step S509, the computer device 430 Step S508 saves the generated entire celestial sphere image into an external storage, and the process ends at Step S510.

Note that the operations in the flowchart in the present embodiment illustrated in FIG. 23 can be executed by a program on a computer. Namely, the CPU controlling operations of the entire celestial sphere imaging device 410, and the CPU controlling operations of the computer device 430 read programs stored in a recording medium such as a ROM or a RAM to load them on respectively memories to implement respective parts of the entire celestial sphere image synthesis process described above. Note that FIG. 22 and FIG. 23 illustrate examples of the entire celestial sphere image imaging system that is separately configured, which do not mean that embodiments are limited to those specifically illustrated in FIG. 22 and FIG. 23. The functional units to implement the entire celestial sphere image imaging system may be distributed to be realized on one or more imaging devices and one or more computer systems in various ways.

By the embodiments described above, it is possible to provide an image processing apparatus, an image processing method, a program, and an imaging system that are capable of detecting appropriate joint positions when detecting joint positions between multiple input images.

Note that, in the embodiments described above, multiple partial images are captured at virtually the same time using different lens optical systems. Alternatively, in another embodiment, multiple partial images may be captured by the same lens optical system at different timings from a predetermined imaging position facing in different imaging directions (azimuths) to be superposed. Moreover, in the embodiments described above, two partial images captured by lens optical systems having field angles greater than 180° are superposed to be synthesized. Alternatively, in another embodiment, three or more partial images captured by one or more lens optical systems may be superposed to be synthesized. Also, in the embodiments described above, the imaging system using fisheye lenses are taken as an example to describe the embodiments, the embodiments may be used for an entire celestial sphere imaging system using super-wide-angle lenses. Further, in the favorable embodiments described above, superposing of an entire celestial sphere image is described, but the application is not limited to that. The embodiments may be applied to any image processing process that needs to detect joint positions of multiple images.

Also, the functional units may be implemented by a computer-executable program written in a legacy programming language or an object oriented programming language such as, an assembler, C, C++, C#, Java (trademark), and may be stored in a machine-readable recording medium such as a ROM, an EEPROM, an EPROM, a flash memory, a flexible disk, a CD-ROM, a CD-RW, a DVD-ROM, a DVD-RAM, a DVD-RW, a Blu-ray Disc, an SD card, and an MO, to be distributed by the media or telecommunications line. Also, a part or all of the functional units may be implemented by a programmable device (PD), for example, a field programmable gate array (FPGA) or an ASIC (application specific IC), and may be distributed through the recording media as data described in an HDL (Hardware Description Language) such as VHDL (Very High Speed Integrated Circuits Hardware Description Language) or Verilog-HDL to generate circuit configuration data to download the functional units on the PD to be implemented on the PD circuit configuration data (bit stream data).

Further, the present invention is not limited to these embodiments and examples described above, but various variations and modifications may be made without departing from the scope of the present invention.

The invention claimed is:

1. An image processing apparatus, synthesizing a plurality of input images, comprising:
  a processor configured to:
  generate a plurality of target images, from a first input image among the input images, to be searched in a region of a second input image among the input images that overlaps the first input image;
  obtain a characteristic amount for each of the target images; and
  synthesize the first input image and the second input image, based on a first joint position detected by using a second joint position of a second target image among the target images in a region of the second input image, the second target image having the characteristic amount greater than that of a first target image among the target images.

2. The image processing apparatus as claimed in claim 1, wherein the processor is further configured to:
  calculate a temporary position for the first target image based on a relative relationship of characteristic amounts between the first target image and one or more of the peripheral target images; and
  calculate an evaluation value of a matching between the first target image and a part of the second input image based on the calculated temporary position for the first target image,
  wherein the first joint position to be based on when synthesizing the first input image and the second input image is a joint position of the first target image with the second input image determined based on the evaluation value.

3. The image processing apparatus as claimed in claim 2, wherein the processor is further configured to:
  determine an order for processing the target images based on the characteristic amounts, the order specifying the relative relationship of the characteristic amounts; and
  calculate the temporary position for the first target image by using the second joint position of the second target image having the characteristic amount greater than that of the first target image and an initial joint position of a third target image from the first target image among the peripheral target images having the characteristic amount less than that of the first target image.

4. The image processing apparatus as claimed in claim 2, wherein the processor is further configured to:
  calculate the temporary position for the first target image by executing at least one of:
  giving weights to one or more of the peripheral target images depending on the relative relationship of the characteristic amounts relative to the first target image, and
  giving the weights to one or more of the peripheral target images depending on distances from the first target image.

5. The image processing apparatus as claimed in claim 2, wherein the processor is further configured to:
  correct the evaluation value based on the matching so that the evaluation value takes a greater value centered around the temporary position.

6. The image processing apparatus as claimed in claim 2, wherein the processor is further configured to:
  set a search range in the second input image for the matching based on the relative relationship of the characteristic amounts between the first target image and the one or more peripheral target images.

7. A method of image processing executed by an image processing apparatus for synthesizing a plurality of input images, the method comprising:
  generating a plurality of target images, from a first input image among the input images, to be searched in a region of a second input image among the input images that overlaps the first input image;
  obtaining a characteristic amount for each of the target images; and
  synthesizing the first input image and the second input image, based on a first joint position detected by using a second joint position of a second target image among the target images in a region of the second input image, the second target image having the characteristic amount greater than that of a first target image among the target images.

8. A non-transitory computer-readable recording medium having a program stored therein for causing an image processing apparatus to execute a process of image processing for synthesizing a plurality of input images, the process comprising:
  generating a plurality of target images, from a first input image among the input images, to be searched in a region of a second input image among the input images that overlaps the first input image;

obtaining a characteristic amount for each of the target images; and synthesizing the first input image and the second input image, based on a first joint position detected by using a second joint position of a second target image among the target images in a region of the second input image, the second target image having the characteristic amount greater than that of a first target image among the target images.

* * * * *